United States Patent
Maeda et al.

(10) Patent No.: US 10,065,674 B2
(45) Date of Patent: Sep. 4, 2018

(54) STEERING CONTROL DEVICE

(71) Applicant: JTEKT CORPORATION, Osaka-shi, Osaka (JP)

(72) Inventors: Shingo Maeda, Okazaki (JP); Hidenori Itamoto, Tajimi (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 15/355,251

(22) Filed: Nov. 18, 2016

(65) Prior Publication Data
US 2017/0151979 A1 Jun. 1, 2017

(30) Foreign Application Priority Data

Nov. 27, 2015 (JP) ................................. 2015-232179
Jun. 3, 2016 (JP) ................................. 2016-112187

(51) Int. Cl.
*B62D 6/00* (2006.01)
*B62D 5/04* (2006.01)

(52) U.S. Cl.
CPC ............. *B62D 6/00* (2013.01); *B62D 5/0457* (2013.01); *B62D 5/0481* (2013.01)

(58) Field of Classification Search
CPC ....... B62D 6/00; B62D 5/0457; B62D 5/0481
USPC .......................................................... 701/41
See application file for complete search history.

(56) References Cited

U.S. PATENT DOCUMENTS

| | | | | |
|---|---|---|---|---|
| 9,327,765 B2 * | 5/2016 | Takeda | ................... | B62D 6/003 |
| 9,623,901 B2 * | 4/2017 | Takeda | ................... | B62D 6/008 |
| 2001/0027893 A1 * | 10/2001 | Nishizaki | ................ | B60T 8/172 |
| | | | | 180/409 |
| 2007/0284180 A1 * | 12/2007 | Suehiro | ................ | B62D 5/0469 |
| | | | | 180/444 |
| 2008/0078608 A1 * | 4/2008 | Hara | ..................... | B62D 5/0484 |
| | | | | 180/446 |
| 2009/0030573 A1 * | 1/2009 | Mikamo | ................ | B62D 5/008 |
| | | | | 701/41 |
| 2013/0261894 A1 * | 10/2013 | Kojima | ................ | B62D 5/0463 |
| | | | | 701/41 |
| 2014/0343789 A1 | 11/2014 | Maeda et al. | | |

(Continued)

FOREIGN PATENT DOCUMENTS

| | | |
|---|---|---|
| JP | 2014-141129 A | 8/2014 |
| JP | 2015-163498 A | 9/2015 |

OTHER PUBLICATIONS

Apr. 4, 2017 Search Report issued in European Patent Application No. 16200161.4.

*Primary Examiner* — Atul Trivedi
(74) *Attorney, Agent, or Firm* — Oliff PLC

(57) ABSTRACT

Provided is a steering control device that more appropriately performs a limiting function for a controlled variable having an abnormal value even if a plurality of kinds of state quantities that are used for steering control include a state quantity that does not meet a required level of reliability. The range of variation in first assist controlled variable calculated by using steering torque, a steering torque differential value, and a steering velocity, namely state quantities for which the required level of reliability is ensured, is limited by final limiting values calculated based on first to third limit maps. The range of variation in compensation amount calculated by using a steering angle, namely a state quantity for which the required level of reliability is not ensured, is limited by predetermined upper and lower limits. A variation in compensation amount per unit time is limited by a predetermined variation limiting value.

10 Claims, 17 Drawing Sheets

(56) References Cited

U.S. PATENT DOCUMENTS

| | | | |
|---|---|---|---|
| 2015/0210318 A1* | 7/2015 | Takeda | B62D 6/003 701/41 |
| 2015/0217801 A1* | 8/2015 | Takeda | B62D 6/008 701/42 |
| 2015/0225014 A1* | 8/2015 | Takeda | B62D 6/008 701/41 |
| 2015/0225015 A1* | 8/2015 | Takeda | B62D 6/008 701/41 |
| 2015/0225017 A1* | 8/2015 | Takeda | B62D 6/008 701/41 |
| 2015/0232124 A1* | 8/2015 | Takeda | B62D 15/025 701/42 |
| 2015/0246686 A1* | 9/2015 | Takeda | B62D 6/008 701/41 |
| 2015/0246687 A1* | 9/2015 | Takeda | B62D 6/002 701/41 |
| 2015/0274203 A1* | 10/2015 | Takeda | B62D 6/008 701/42 |
| 2015/0274206 A1* | 10/2015 | Takeda | B62D 6/008 701/41 |
| 2015/0291210 A1* | 10/2015 | Kageyama | B60T 8/1755 701/41 |
| 2015/0329142 A1* | 11/2015 | Takeda | B62D 6/003 701/41 |
| 2015/0353127 A1* | 12/2015 | Takeda | B62D 6/008 701/41 |
| 2016/0114832 A1* | 4/2016 | Taniguchi | B62D 6/008 701/41 |
| 2016/0221446 A1* | 8/2016 | Suzuki | B60L 15/20 |
| 2016/0297439 A1* | 10/2016 | Inoue | B60W 10/184 |
| 2017/0259845 A1* | 9/2017 | Nozawa | B62D 5/0463 |

* cited by examiner

STEERING CONTROL DEVICE

INCORPORATION BY REFERENCE

The disclosure of Japanese Patent Application No. 2015-232179 filed on Nov. 27, 2015 and No. 2016-112187 filed on Jun. 3, 2016 including the specification, drawings and abstract, is incorporated herein by reference in its entirety.

BACKGROUND OF THE INVENTION

1. Field of the Invention

The present invention relates to steering control devices.

2. Description of the Related Art

Conventionally, there are electric power steering systems (EPS) that apply motor torque serving as an assist force to a steering mechanism of a vehicle. For example, a control device of an EPS described in Japanese Patent Application Publication No. 2015-163498 (JP 2015-163498 A) calculates an assist controlled variable based on a plurality of kinds of state quantities indicating the steering state such as steering torque and a steering angle, and controls a motor based on the assist controlled variable. The control device individually sets limiting values (upper and lower limits) for each state quantity. The limiting values are the values that limit the range of variation in assist controlled variable according to each state quantity. The control device calculates the sums of these individually set limiting values to generate final limiting values for the assist controlled variable. The control device of the EPS thus has a limiting function for abnormal assist controlled variables. Accordingly, when a calculated assist controlled variable has an abnormal value, the control device limits the abnormal assist controlled variable to an appropriate value according to each state quantity by the final limiting values.

However, the EPS of JP 2015-163498 A has the following problem. In order to ensure reliability of the limiting function for the assist controlled variable, the plurality of kinds of state qualities that are used to calculate the assist controlled variable are required to have a certain level of reliability. However, depending on the specifications specified by vehicle manufacturers etc., the plurality of kinds of state quantities may include a state quantity that does not meet the required level of reliability. In this case, the control device of the EPS has to calculate the limiting values by using the state quantity that does not meet the required level of reliability. Since reliability of the limiting values calculated by using such a state quantity is not ensured, the control device may not be able to limit an assist controlled variable having an abnormal value to an appropriate intended value.

SUMMARY OF THE INVENTION

It is one object of the present invention to provide a steering control device that more appropriately perform a limiting function for a controlled variable having an abnormal value even if a plurality of kinds of state qualities to be used for steering control include a state quality that does not meet a required level of reliability.

According to one aspect of the present invention, a steering control device includes: a command value calculation circuit that calculates a command value for a power source that generates power to be applied to a steering mechanism of a vehicle, based on a first controlled variable and a second controlled variable which are calculated based on a plurality of kinds of state quantities indicating a steering state of a steering steering state. The command value calculation circuit includes: a first control circuit that calculates the first controlled variable based on a first state quantity that meets a required level of reliability out of the plurality of kinds of state quantities; a first processing circuit that performs a first limiting process of setting, for each first state quantity, a first limiting value that limits a range of variation in the first controlled variable according to the first state quantity, and limiting the range of variation in the first controlled variable based on the first limiting value; a second control circuit that calculates a basic component of the second controlled variable based on a second state quantity that does not meet the required level of reliability out of the plurality of kinds of state quantities; and a second processing circuit that performs a second limiting process of limiting a range of variation in the basic component by using a predetermined second limiting value, and calculates the second controlled variable based on the basic component subjected to the second limiting process.

According to this configuration, the first limiting value that limits the range of variation in the first controlled variable is individually set for each first state quantity that is used to calculate the first controlled variable. Accordingly, a more precise limiting process can be performed on the first controlled variable. Since the first limiting value is set according to the first state quantity and for each first state quantity, the first state quantity should meet a required level of reliability. In the above configuration, since the first state quantity meets the required level of reliability, the level of reliability of the first limiting value that is set based on the first state quantity is ensured. The range of variation in the second controlled variable is limited by the predetermined second limiting value. Unlike the first limiting value that is set according to the state quantity, the second limiting value is not affected by whether or not the state quantity meets the required level of reliability. A more appropriate limiting process can therefore be performed on the second controlled variable that is calculated based on the second state quantity that does not meet the required level of reliability. Accordingly, even if the plurality of kinds of state quantities that are used to calculate the command value for the power source include a state quantity that does not meet the required level of reliability, a limiting function for the first and second controlled variables that are used as a basis for calculation of the command value can be more appropriately performed. Moreover, since a more appropriate command value is calculated, more appropriate power can be applied to the steering mechanism.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

A first embodiment of the present invention will be described. In the first embodiment, a steering control device of the present invention is embodied as an electronic control unit (ECU) of an electric power steering system.

Figure 1:
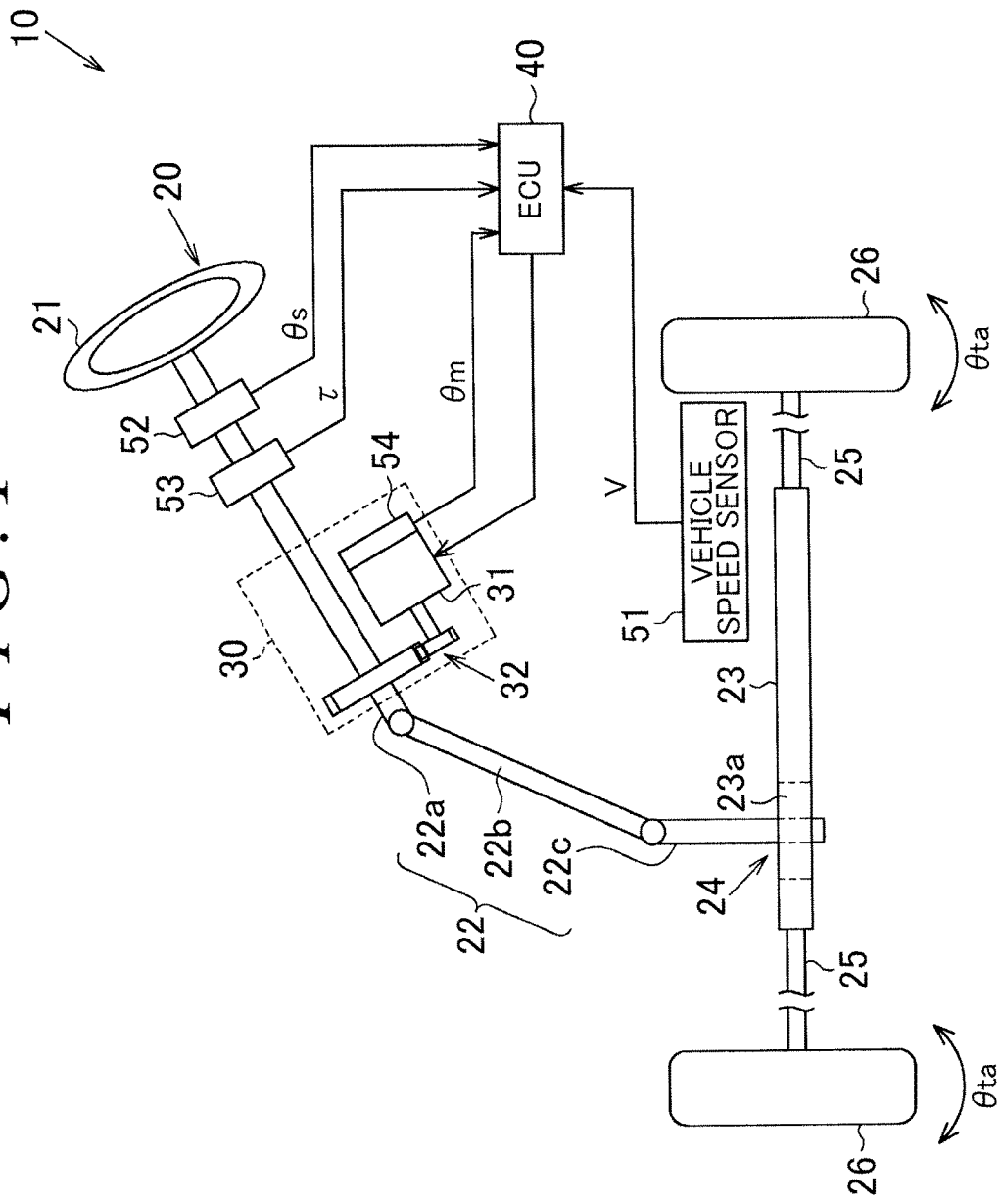
FIG. 1 is a configuration diagram showing an example of an electric power steering system having an electronic control unit according to a first embodiment.

As shown in FIG. 1, an electric power steering system 10 includes a steering mechanism 20 that steers steered wheels 26 based on driver's steering operation, an steering assist mechanism 30 that assists driver's steering operation, and an electronic control unit (ECU) 40 that controls operation of the steering assist mechanism 30.

The steering mechanism 20 includes a steering wheel 21 that is operated by the driver and a steering shaft 22 that rotates with the steering wheel 21. The steering shaft 22 is formed by a column shaft 22a, an intermediate shaft 22b, and a pinion shaft 22c. The column shaft 22a is coupled to the center of the steering wheel 21. The intermediate shaft 22b is coupled to the lower end of the column shaft 22a. The pinion shaft 22c is coupled to the lower end of the intermediate shaft 22b. The lower end of the pinion shaft 22c meshes with a rack shaft 23 (to be exact, a rack toothed portion 23a) that extends in a direction crossing the pinion shaft 22c. A rack and pinion mechanism 24 is formed by the pinion shaft 22c and the rack shaft 23, and the rack and pinion mechanism 24 thus converts the rotary motion of the steering shaft 22 to a reciprocating linear motion of the rack shaft 23. The reciprocating linear motion is transmitted to the right and left steered wheels 26 via tie rods 25 coupled to both ends of the rack shaft 23, whereby the steered angle θta of the steered wheels 26 is changed.

The steering assist mechanism 30 includes a motor 31 that serves as a source of a steering assist force. For example, the motor 31 is a brushless motor etc. The motor 31 is coupled to the column shaft 22a via a speed reduction mechanism 32. The speed reduction mechanism 32 reduces the rotational speed of the motor 31 and transmits the resultant rotational force to the column shaft 22a. That is, the torque of the motor 31 is applied as a steering assist force (assist force) to the steering shaft 22, whereby driver's steering operation is assisted.

The ECU 40 obtains the detection results of various sensors mounted on a vehicle as information (state quantities) indicating a request from the driver, the traveling state, and the steering state, and controls the motor 31 according to the various information obtained. For example, the various sensors include a vehicle speed sensor 51, a steering sensor 52, a torque sensor 53, and a rotation angle sensor 54. The vehicle speed sensor 51 detects the vehicle speed V (the traveling speed of the vehicle). The steering sensor 52 is mounted on the column shaft 22a. The steering sensor 52 is a relative angle sensor that detects the steering angle θs, or a relative change in angle of the steering wheel 21. The torque sensor 53 is also mounted on the column shaft 22a and detects steering torque τ. The rotation angle sensor 54 is mounted on the motor 31 and detects the rotation angle θm of the motor 31. The ECU 40 calculates a target assist force based on the vehicle speed V, the steering angle θs, the steering torque τ, and the rotation angle θm and supplies driving power to the motor 31 to cause the steering assist mechanism 30 to generate the target assist force.

Figure 2:
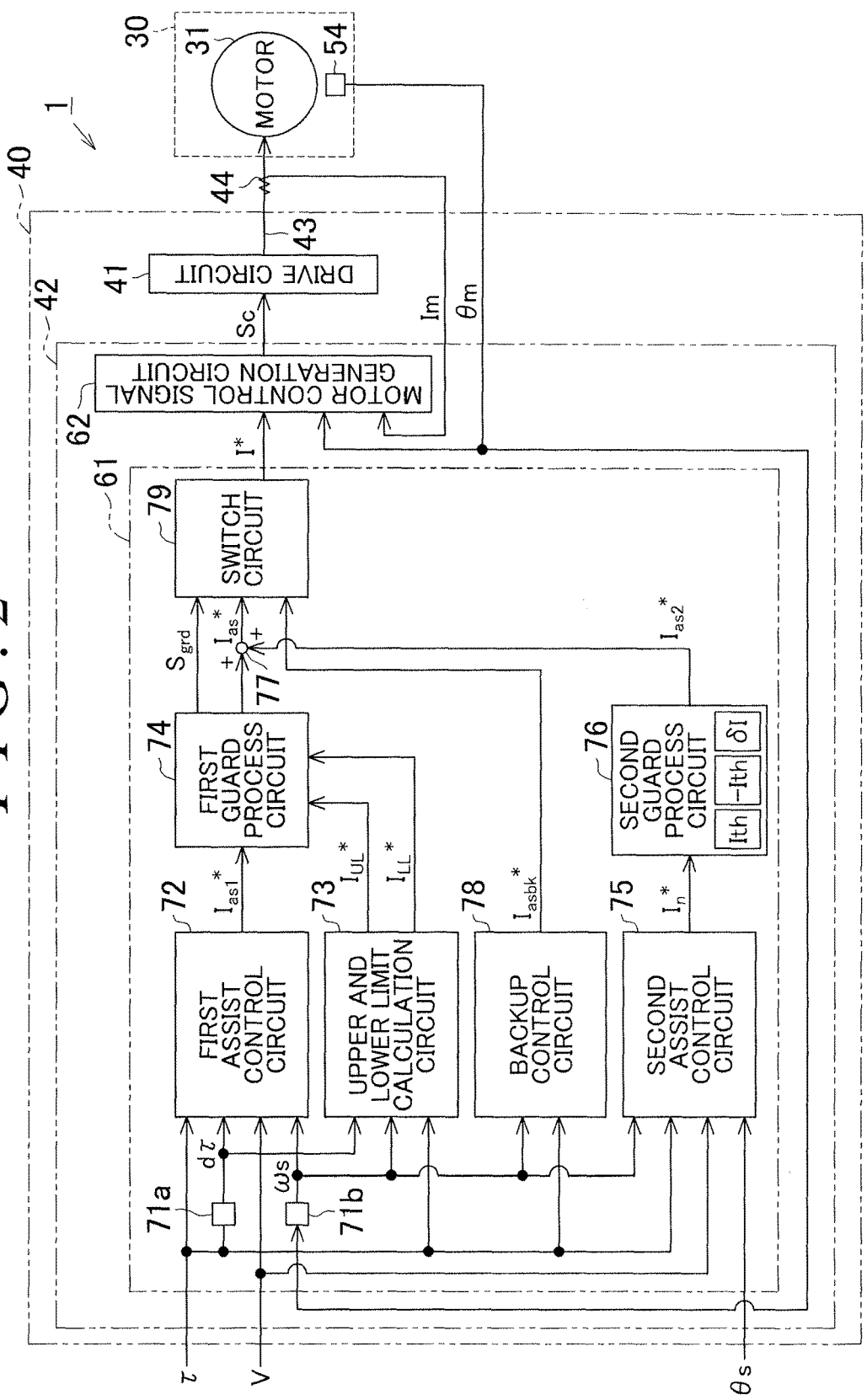
FIG. 2 is a control block diagram showing an example of the electronic control unit of the first embodiment.

The hardware configuration of the ECU 40 will be described. As shown in FIG. 2, the ECU 40 includes a drive circuit (inverter circuit) 41 and a microcomputer 42.

The drive circuit 41 converts direct current (DC) power supplied from a DC power source such as a battery to three-phase alternating current (AC) power based on a motor control signal Sc (pulse width modulation (PWM) drive signal) generated by the microcomputer 42. The three-phase AC power thus produced is supplied to the motor 31 via three-phase feed paths 43. A current sensor 44 is provided on each of the three-phase feed paths 43. These three-phase current sensors 44 detect actual current values Im on the three-phase feed paths 43. In FIG. 2, the three-phase feed paths 43 and the three-phase current sensors 44 are collectively shown as a single feed path 43 and a single current sensor 44 for convenience of description.

The microcomputer 42 receives each of the detection results of the vehicle speed sensor 51, the steering sensor 52, the torque sensor 53, the rotation angle sensor 54, and the current sensors 44 at predetermined sampling intervals. The microcomputer 42 generates the motor control signal Sc based on the received detection results, namely the vehicle speed V, the steering angle θs, the steering torque τ, the rotation angle θm, and the actual current values Im.

The functional configuration of the microcomputer 42 will be described. The microcomputer 42 has various arithmetic processing circuits that are implemented by executing control programs stored in its storage device, not shown.

As shown in FIG. 2, the microcomputer 42 includes as the various arithmetic processing circuits a current command value calculation circuit 61 and a motor control signal generation circuit 62. The current command value calculation circuit 61 calculates a current command value I* based on the steering torque τ, the vehicle speed V, the steering angle θs, and the rotation angle θm. The current command value I* is a command value that indicates a current to be supplied to the motor 31. To be exact, the current command value I* includes a q-axis current command value and a d-axis current command value on a d-q coordinate system. In this example, the d-axis current command value is set to zero. The d-q coordinate system represents rotational coordinates according to the rotation angle θm of the motor 31. The motor control signal generation circuit 62 converts the three-phase current values Im of the motor 31 to two-phase vector components, namely a d-axis current value and a q-axis current value on the d-q coordinate system, by using the rotation angle θm. The motor control signal generation circuit 62 obtains a deviation between the d-axis current value and the d-axis current command value and a deviation between the q-axis current value and the q-axis current command value and generates the motor control signal Sc so as to eliminate these deviations.

The general functional configuration of the current command value calculation circuit 61 will be described. As shown in FIG. 2, the current command value calculation circuit 61 includes two differentiators 71a, 71b. The differentiator 71a differentiates the steering torque τ with respect to time to calculate a steering torque differential value dτ. The differentiator 71b differentiates the rotation angle θm of the motor 31 with respect to time to calculate a steering velocity (steering angular velocity) ωs.

The current command value calculation circuit 61 includes a first assist control circuit 72, an upper and lower limit calculation circuit 73, a first guard process circuit 74, a second assist control circuit 75, a second guard process circuit 76, an adder 77, a backup control circuit 78, and a switch circuit 79.

The first assist control circuit 72 calculates a first assist controlled variable $I_{as1}^*$ based on the steering torque τ, the vehicle speed V, the steering velocity ωs, and the steering torque differential value dτ. The first assist controlled variable $I_{as1}^*$ serves as a basis for calculating the current command value I*.

The upper and lower limit calculation circuit 73 calculates an upper limit $I_{UL}^*$ and a lower limit $I_{LL}^*$, or limiting values for the first assist controlled variable $I_{as1}^*$, based on various signals that are used in the first assist control circuit 72, and in this example, based on the steering torque τ, the steering torque differential value dτ, and the steering velocity ωs. The upper limit $I_{UL}^*$ and the lower limit $I_{LL}^*$ serve as final limiting values for the first assist controlled variable $I_{as1}^*$.

The first guard process circuit 74 performs a process of limiting the first assist controlled variable $I_{as1}^*$ based on the upper limit $I_{UL}^*$ and the lower limit $I_{LL}^*$ calculated by the upper and lower limit calculation circuit 73. That is, the first guard process circuit 74 compares the value of the first assist controlled variable $I_{as1}^*$ with the upper limit $I_{UL}^*$ and the lower limit $I_{LL}^*$. The first guard process circuit 74 limits the first assist controlled variable $I_{as1}^*$ to the upper limit $I_{UL}^*$ when the first assist controlled variable $I_{as1}^*$ is larger than the upper limit $I_{UL}^*$, and limits the first assist controlled variable $I_{as1}^*$ to the lower limit $I_{LL}^*$ when the first assist controlled variable $I_{as1}^*$ is smaller than the lower limit $I_{LL}^*$. The first guard process circuit 74 also generates a limiting state signal $S_{grd}$ that indicates whether the first assist controlled variable $I_{as1}^*$ has been limited. The first guard process circuit 74 supplies the first assist controlled variable $I_{as1}^*$ (first assist controlled variable $I_{as1}^*$ before or after limitation) and the limiting state signal $S_{grd}$ to the switch circuit 79.

The second assist control circuit 75 calculates a compensation amount $I_n^*$, or a basic component of a second assist controlled variable $I_{as2}^*$, based on the steering torque τ, the vehicle speed V, the steering velocity ωs, and the steering angle θs. The compensation amount $I_n^*$ is originally a basic component that is used to calculate the first assist controlled variable $I_{as1}^*$ in order to achieve a better steering feel.

The second guard process circuit 76 performs a process of limiting the compensation amount $I_n^*$ calculated by the second assist control circuit 75 based on predetermined upper and lower limits $I_{th}$, $-I_{th}$. The upper limit $I_{th}$ is a positive value and the lower limit $-I_{th}$ is a negative value. The second guard process circuit 76 also performs a variation limiting process, or a process of limiting a variation in compensation amount $I_n^*$ per unit time based on a predetermined variation limiting value δI. The upper limit $I_{th}$, the lower limit $-I_{th}$, and the variation limiting value δI are stored in the storage device, not shown, of the microcomputer 42. The second guard process circuit 76 calculates a second assist controlled variable $I_{as2}^*$ based on the compensation amount $I_n^*$ (compensation amount $I_n^*$ before or after limitation). The second assist controlled variable $I_{as2}^*$ serves as a basis for calculating the current command value I*.

The adder 77 adds the second assist controlled variable $I_{as2}^*$ calculated by the second guard process circuit 76 to the first assist controlled variable $I_{as1}^*$ received from the first guard process circuit 74 to produce a final assist controlled variable $I_{as}^*$.

The backup control circuit 78 has a function to calculate a backup assist controlled variable $I_{asbk}^*$. The backup control circuit 78 calculates the backup assist controlled variable $I_{asbk}^*$ based on the steering torque τ and the steering velocity ωs. The backup assist controlled variable $I_{asbk}^*$ is used for assist backup control. The assist backup control is performed in the event of an abnormal condition in which the first assist controlled variable $I_{as1}^*$ or the second assist controlled variable $I_{as2}^*$ is limited. The backup assist controlled variable $I_{asbk}^*$ may be calculated in a more simple manner than the first assist controlled variable $I_{as1}^*$.

The switch circuit 79 receives the final assist controlled variable $I_{as}^*$ calculated by the adder 77 and the backup assist controlled variable $I_{asbk}^*$ calculated by the backup control circuit 78. The switch circuit 79 uses one of the final assist controlled variable $I_{as}^*$ and the backup assist controlled variable $I_{asbk}^*$ as a basis for calculating the current command value I*.

The switch circuit 79 determines whether the first assist controlled variable $I_{as1}^*$ has been limited or not based on the limiting state signal $S_{grd}$ generated by the first guard process circuit 74. The switch circuit 79 decides on which of the final assist controlled variable $I_{as}^*$ and the backup assist controlled variable $I_{asbk}^*$ to use based on whether the first assist controlled variable $I_{as1}^*$ has been limited for a certain period of time. If it is determined that the first assist controlled variable $I_{as1}^*$ has been limited for the certain period of time, the switch circuit 79 uses the backup assist controlled variable $I_{asbk}^*$ instead of the first assist controlled variable $I_{as1}^*$. If it is determined that the first assist controlled variable $I_{as1}^*$ has not been limited for the certain period of time, the switch circuit 79 continues to use the first assist controlled variable $I_{as1}^*$.

Figure 3:
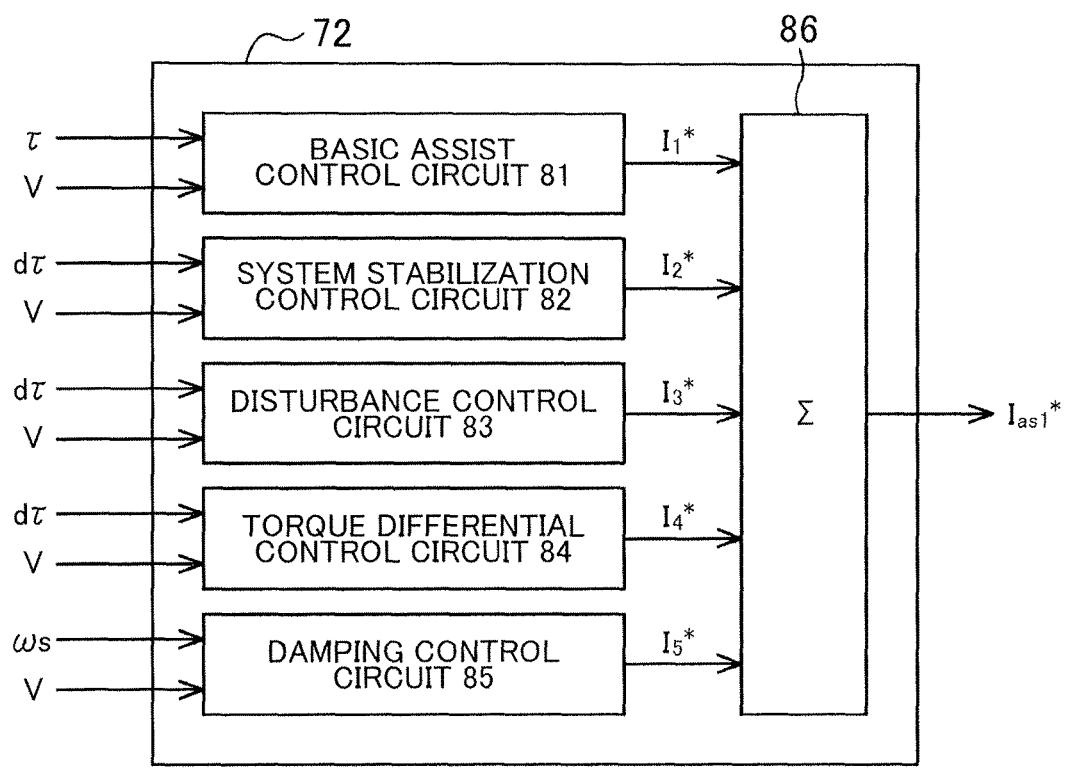
FIG. 3 is a control block diagram showing an example of a first assist control circuit of the first embodiment.

The first assist control circuit 72 will be described in detail. As shown in FIG. 3, the first assist control circuit 72 includes a basic assist control circuit 81, a system stabilization control circuit 82, a disturbance control circuit 83, a torque differential control circuit 84, a damping control circuit 85, and an adder 86.

The basic assist control circuit 81 calculates a basic assist controlled variable $I_1^*$ based on the steering torque τ and the vehicle speed V. The basic assist controlled variable $I_1^*$ is a basic component (current value) that is used to generate a target assist force of an appropriate magnitude according to the steering torque τ and the vehicle speed V. For example, the basic assist control circuit 81 calculates the basic assist controlled variable $I_1^*$ by using an assist characteristic map stored in the storage device, not shown, of the microcomputer 42. The assist characteristic map is a vehicle speed-sensitive three-dimensional map that is used to calculate the basic assist controlled variable $I_1^*$ based on the steering torque τ and the vehicle speed V. The vehicle speed-sensitive three-dimensional map is set so that the larger the steering torque τ (absolute value) is and the lower the vehicle speed V is, the larger the value (absolute value) of the calculated basic assist controlled variable $I_1^*$ is. The basic assist control circuit 81 may calculate the basic assist controlled variable $I_1^*$ without taking the vehicle speed V into consideration.

The system stabilization control circuit 82, the disturbance control circuit 83, the torque differential control circuit 84, and the damping control circuit 85 perform various compensation control on the basic assist controlled variable $I_1^*$ in order to achieve a better steering feel. This will be described specifically below.

The system stabilization control circuit 82 calculate a compensation amount $I_2^*$ (current value) that is used to restrain resonance characteristics that vary according to the assist amount, based on the steering torque differential value dτ and the vehicle speed V. Correcting the basic assist controlled variable $I_1^*$ by using the compensation amount $I_2^*$ stabilizes the entire control system of the electric power steering system 10.

The disturbance control circuit 83 detects a reverse input vibration component as the steering torque differential value dτ and calculates a compensation amount $I_3^*$ (current value) that is used to compensate for disturbance such as reverse input vibration, based on the detected steering torque differential value dτ and the vehicle speed V. Correcting the basic assist controlled variable $I_1^*$ by using the compensation amount $I_3^*$ restrains disturbance such as brake vibration associated with a braking operation. This is because an assist force in a direction that cancels out the reverse input vibration is generated according to the compensation amount $I_3^*$.

The torque differential control circuit 84 calculates a compensation amount $I_4^*$ (current value) that is used to achieve faster response to a change in steering torque in applying an assist force. Correcting the basic assist controlled variable $I_1^*$ by using the compensation amount $I_4^*$ restrains delay in response to a change in steering torque in applying an assist force. This restrains a heavy steering feel the driver has when he/she starts turning the steering wheel 21, a loose steering feel the driver has when he/she finishes turning the steering wheel 21, etc.

The damping control circuit 85 calculates a compensation amount $I_5^*$ (current value) that is used to compensate for viscosity of the steering mechanism 20 based on the steering velocity ωs and the vehicle speed V. For example, correcting the basic assist controlled variable $I_1^*$ by using the compensation amount $I_5^*$ reduces small quick vibrations that are transmitted to the steering wheel 21 etc.

As a process of correcting the basic assist controlled variable $I_1^*$, the adder 86 adds the compensation amounts $I_2^*$, $I_3^*$, $I_4^*$, $I_5^*$ to the basic assist controlled variable $I_1^*$ to generate the first assist controlled variable $I_{as1}^*$.

Figure 4:
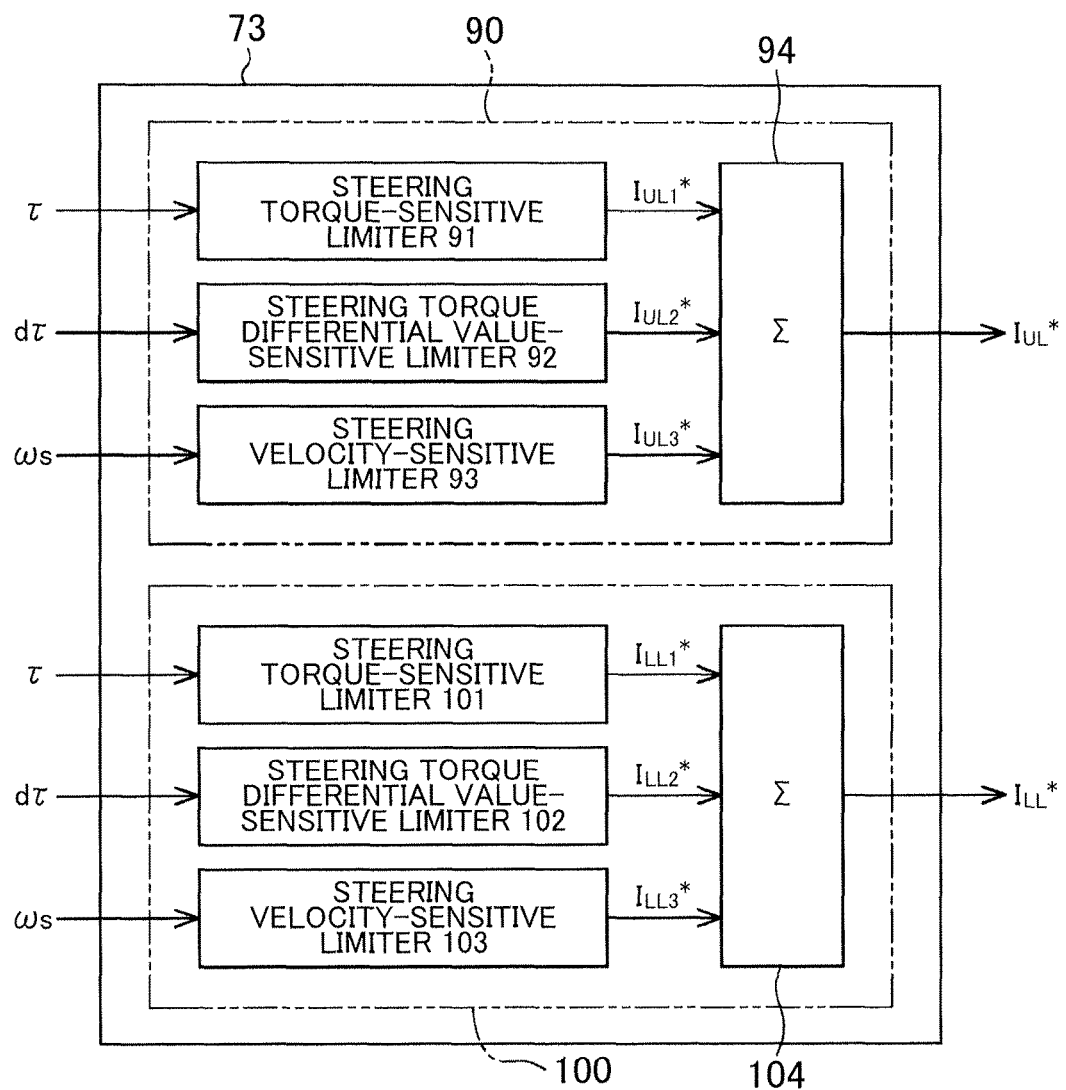
FIG. 4 is a control block diagram showing an example of an upper and lower limit calculation circuit of the first embodiment.

The upper and lower limit calculation circuit 73 will be described in detail. As shown in FIG. 4, the upper and lower limit calculation circuit 73 includes an upper limit calculation circuit 90 and a lower limit calculation circuit 100.

The upper limit calculation circuit 90 includes a steering torque-sensitive limiter 91, a steering torque differential value-sensitive limiter 92, a steering velocity-sensitive limiter 93, and an adder 94. The steering torque-sensitive limiter 91 calculates an upper limit $I_{UL1}^*$ for the first assist controlled variable $I_{as1}^*$ according to the steering torque τ. The steering torque differential value-sensitive limiter 92 calculates an upper limit $I_{UL2}^*$ for the first assist controlled variable $I_{as1}^*$ according to the steering torque differential value dτ. The steering velocity-sensitive limiter 93 calculates an upper limit $I_{UL3}^*$ for the first assist controlled variable $I_{as1}^*$ according to the steering velocity ωs. The adder 94 adds these three upper limits $I_{UL1}^*$ to $I_{UL3}^*$ together to produce the upper limit $I_{UL}^*$ for the first assist controlled variable $I_{as1}^*$.

The lower limit calculation circuit 100 includes a steering torque-sensitive limiter 101, a steering torque differential value-sensitive limiter 102, a steering velocity-sensitive limiter 103, and an adder 104. The steering torque-sensitive limiter 101 calculates a lower limit $I_{LL1}^*$ for the first assist controlled variable $I_{as1}^*$ according to the steering torque τ. The steering torque differential value-sensitive limiter 102 calculates a lower limit $I_{LL2}^*$ for the first assist controlled variable $I_{as1}^*$ according to the steering torque differential value dτ. The steering velocity-sensitive limiter 103 calculates a lower limit $I_{LL3}^*$ for the first assist controlled variable $I_{as1}^*$ according to the steering velocity ωs. The adder 104 adds these three lower limits $I_{LL1}^*$ to $I_{LL3}^*$ together to produce the lower limit $I_{LL}^*$ for the first assist controlled variable $I_{as1}^*$.

Upper and lower limit maps will be described. The upper limit calculation circuit 90 and the lower limit calculation circuit 100 use first to third limit maps M1 to M3 to calculate the upper limits $I_{UL1}^*$ to $I_{UL3}^*$ and the lower limits $I_{LL1}^*$ to $I_{LL3}^*$. The first to third limit maps M1 to M3 are stored in the storage device, not shown, of the microcomputer 42. The first to third limit maps M1 to M3 are set so that any first assist controlled variable $I_{as1}^*$ calculated according to driver's steering operation is considered acceptable and other first assist controlled variables $I_{as1}^*$ having abnormal values for any reason are considered unacceptable.

Figure 5:
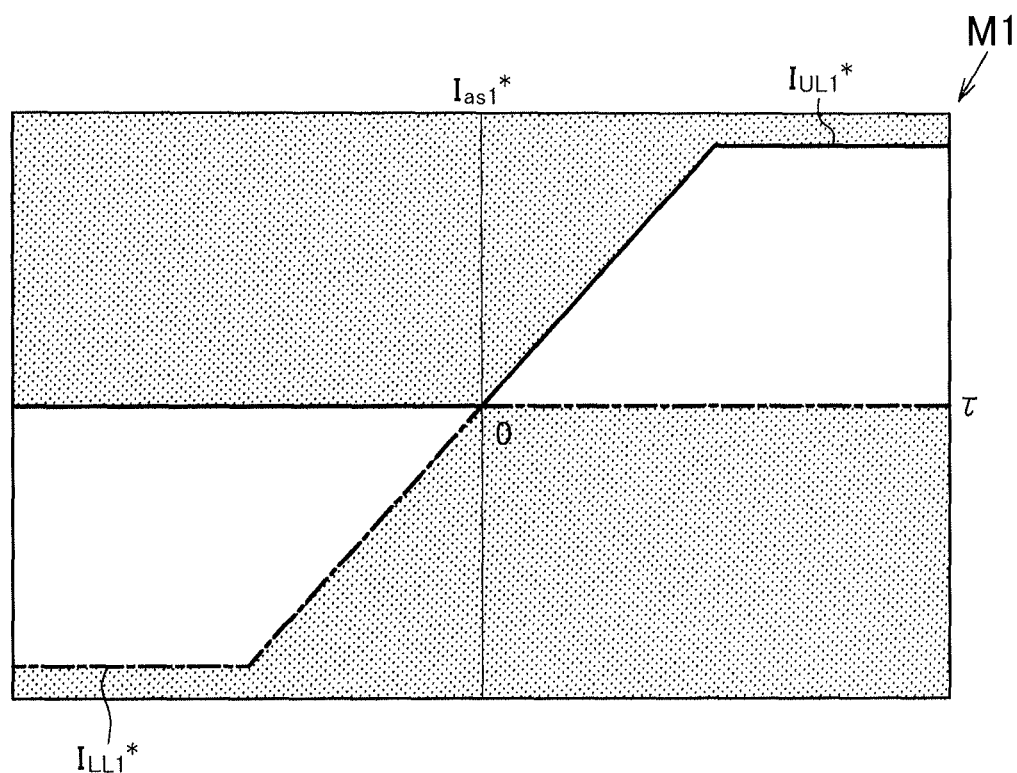
FIG. 5 is a map showing an example of the relationship between steering torque and limiting values in the first embodiment.

As shown in FIG. 5, the first limit map M1 is a map with the steering torque τ on the abscissa and the first assist controlled variable $I_{as1}^*$ on the ordinate. The first limit map M1 defines the relationship between the steering torque τ and the upper limit $I_{UL1}^*$ for the first assist controlled variable $I_{as1}^*$ and the relationship between the steering torque τ and the lower limit $I_{LL1}^*$ for the first assist controlled variable $I_{as1}^*$. The steering torque-sensitive limiters 91, 101 use the first limit map M1 to calculate the upper limit $I_{UL1}^*$ and the lower limit $I_{LL1}^*$ according to the steering torque τ.

The first limit map M1 has the following characteristics as it is set so that any first assist controlled variable $I_{as1}^*$ in the same direction (positive or negative sign) as the steering torque τ is considered acceptable and any first assist controlled variable $I_{as1}^*$ in a different direction from the steering torque τ is considered unacceptable. When the steering torque τ is positive, the upper limit $I_{UL1}^*$ for the first assist controlled variable $I_{as1}^*$ increases in the positive direction with an increase in steering torque τ, and is maintained at a certain positive value when the steering torque τ has a predetermined value or larger. When the steering torque τ is positive, the lower limit $I_{LL1}^*$ for the first assist controlled variable $I_{as1}^*$ is maintained at zero. When the steering torque τ is negative, the upper limit $I_{UL1}^*$ for the first assist controlled variable $I_{as1}^*$ is maintained at zero. When the steering torque τ is negative, the lower limit $I_{LL1}^*$ for the first assist controlled variable $I_{as1}^*$ increases in the negative direction with an increase in absolute value of the steering torque τ, and is maintained at a certain negative value when the absolute value of the steering torque τ has a predetermined value or larger.

Figure 6:
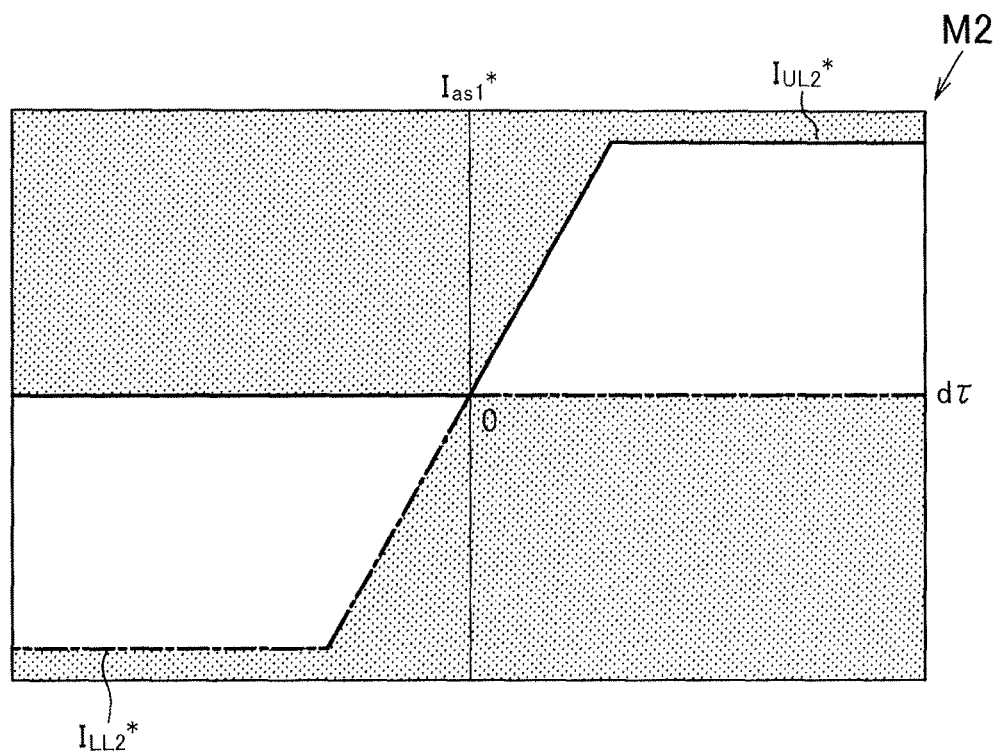
FIG. 6 is a map showing an example of the relationship between a differential value of steering torque and limiting values in the first embodiment.

As shown in FIG. 6, the second limit map M2 is a map with the steering torque differential value dτ on the abscissa and the first assist controlled variable $I_{as1}^*$ on the ordinate. The second limit map M2 defines the relationship between the steering torque differential value dτ and the upper limit $I_{UL2}^*$ for the first assist controlled variable $I_{as1}^*$ and the relationship between the steering torque differential value dτ and the lower limit $I_{LL2}^*$ for the first assist controlled variable $I_{as1}^*$. The steering torque differential value-sensitive limiters 92, 102 use the second limit map M2 to calculate the upper limit $I_{UL2}^*$ and the lower limit $I_{LL2}^*$ according to the steering torque differential value dτ.

The second limit map M2 has the following characteristics as it is set so that any first assist controlled variable $I_{as1}^*$ in the same direction (positive or negative sign) as the steering torque differential value dτ is considered acceptable and any first assist controlled variable $I_{as1}^*$ in a different direction from the steering torque differential value dr is considered unacceptable. That is, when the steering torque differential value dτ is positive, the upper limit $I_{UL2}^*$ for the first assist controlled variable $I_{as1}^*$ increases in the positive direction with an increase in steering torque differential value dτ, and is maintained at a certain positive value when the steering torque differential value dτ has a predetermined value or larger. When the steering torque differential value dτ is positive, the lower limit $I_{LL2}^*$ for the first assist controlled variable $I_{as1}^*$ is maintained at zero. When the steering torque differential value dτ is negative, the upper limit $I_{UL2}^*$ for the first assist controlled variable $I_{as1}^*$ is maintained at zero. When the steering torque differential value dτ is negative, the lower limit $I_{LL2}^*$ for the first assist controlled variable $I_{as1}^*$ increases in the negative direction with an increase in absolute value of the steering torque differential value dτ, and is maintained at a certain negative value when the absolute value of the steering torque differential value dτ has a predetermined value or larger.

Figure 7:
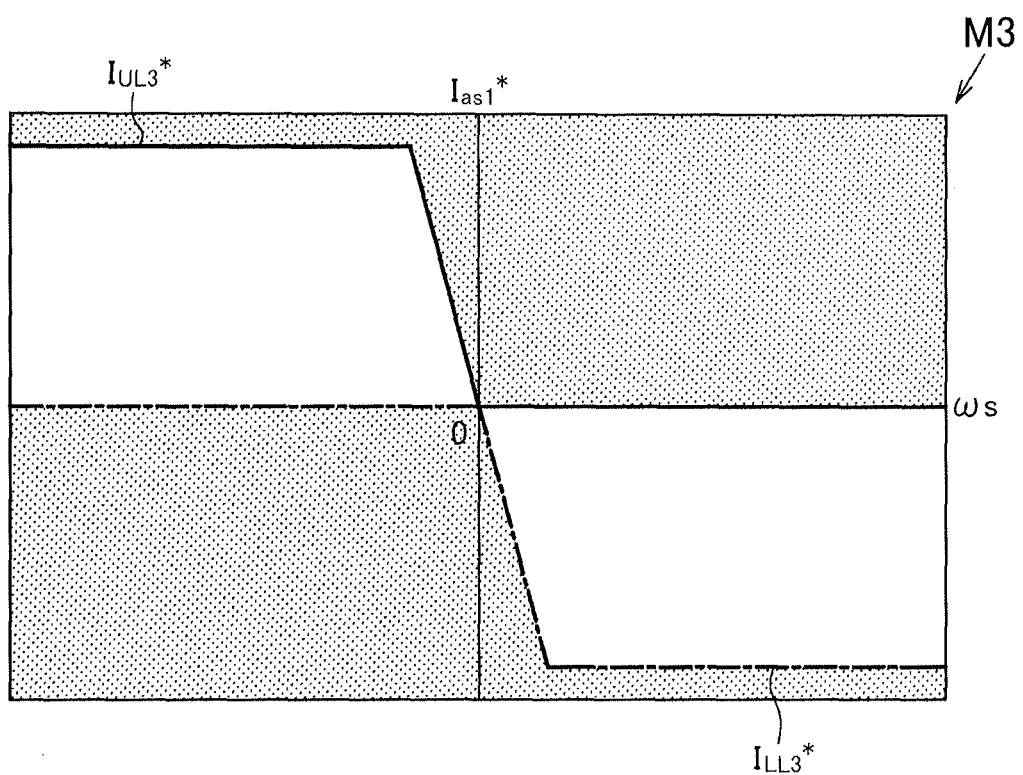
FIG. 7 is a map showing an example of the relationship between a steering velocity and limiting values in the first embodiment.

As shown in FIG. 7, the third limit map M3 is a map with the steering velocity ωs on the abscissa and the first assist controlled variable $I_{as1}^*$ on the ordinate. The third limit map M3 defines the relationship between the steering velocity ωs and the upper limit $I_{UL3}^*$ for the first assist controlled variable $I_{as1}^*$ and the relationship between the steering velocity ωs and the lower limit $I_{LL3}^*$ for the first assist controlled variable $I_{as1}^*$. The steering velocity-sensitive limiters 93, 103 use the third limit map M3 to calculate the upper limit $I_{UL3}^*$ and the lower limit $I_{LL3}^*$ according to the steering velocity ωs.

The third limit map M3 has the following characteristics as it is set so that any first assist controlled variable $I_{as1}^*$ in the opposite direction (positive or negative sign) to the steering velocity ωs is considered acceptable and any first assist controlled variable $I_{as1}^*$ in the same direction as the steering velocity ωs is considered unacceptable. That is, when the steering velocity ωs is positive, the upper limit $I_{UL3}^*$ for the first assist controlled variable $I_{as1}^*$ is maintained at zero. When the steering velocity ωs is positive, the lower limit $I_{LL3}^*$ for the first assist controlled variable $I_{as1}^*$ increases in the negative direction with an increase in steering velocity ωs, and is maintained at a certain negative value when the steering velocity ωs has a predetermined value or larger. When the steering velocity ωs is negative, the upper limit $I_{UL3}^*$ for the first assist controlled variable $I_{as1}^*$ increases in the positive direction with an increase in absolute value of the steering velocity ωs, and is maintained at a certain positive value when the absolute value of the steering velocity ωs has a predetermined value or larger. When the steering velocity ωs is negative, the lower limit $I_{LL3}^*$ for the first assist controlled variable $I_{as1}^*$ is maintained at zero.

Figure 8:
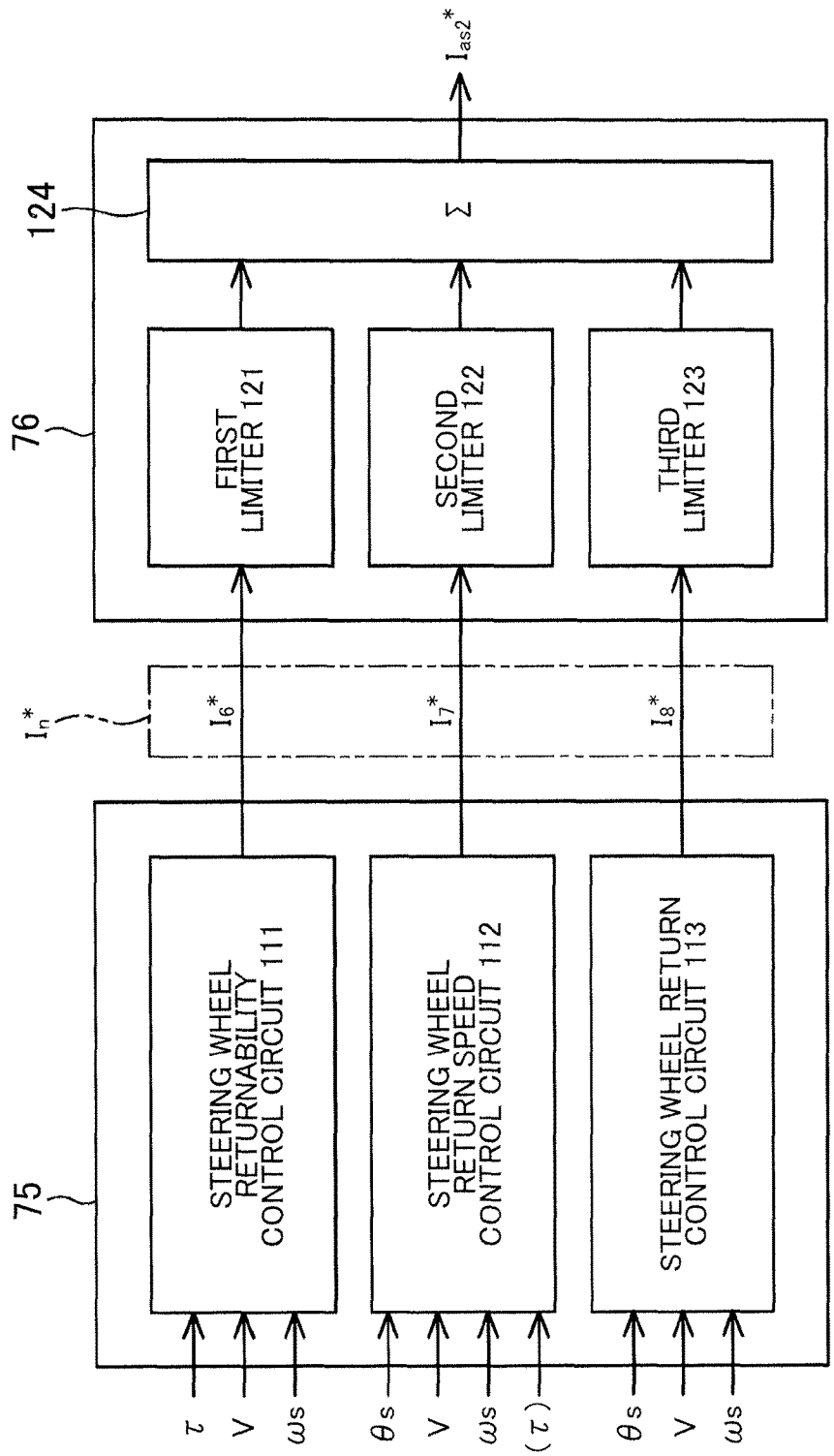
FIG. 8 is a control block diagram showing an example of a second assist control circuit and a second guard process circuit of the first embodiment.

The second assist control circuit 75 will be described in detail. As shown in FIG. 8, the second assist control circuit 75 includes a steering wheel returnability control circuit 111, a steering wheel return speed control circuit 112, and a steering wheel return control circuit 113. The steering wheel returnability control circuit 111, the steering wheel return speed control circuit 112, and the steering wheel return control circuit 113 perform various compensation control on the first assist controlled variable $I_{as1}^*$ in order to achieve a better steering feel (in particular, excellent steering wheel returnability). This will be described specifically below.

The steering wheel returnability control circuit 111 calculates a compensation amount $I_6^*$ that is used to adjust the way the steering wheel 21 returns, based on the steering torque τ, the vehicle speed V, and the steering velocity ωs. For example, correcting the first assist controlled variable $I_{as1}^*$ by using the compensation amount $I_6^*$ reduces the difference between the degree to which the steering wheel 21 returns rightward toward a neutral position and the degree to which the steering wheel 21 returns leftward toward the neutral position. The steering wheel returnability control circuit 111 may calculate the compensation amount $I_6^*$ without taking the vehicle speed V into consideration.

The steering wheel return speed control circuit 112 calculates a compensation amount $I_7^*$ that is used to adjust the return speed of the steering wheel 21 based on the steering angle θs, the vehicle speed V, and the steering velocity ωs. Correcting the first assist controlled variable $I_{as1}^*$ by using the compensation amount $I_7^*$ allows the steering wheel 21 to return to the neutral position at a return speed according to the steering angle θs. The steering wheel return speed control circuit 112 may calculate the compensation amount $I_7^*$ by taking the steering torque τ into consideration.

The steering wheel return control circuit 113 calculates a compensation amount $I_8^*$ that is used to adjust the way the steering wheel 21 returns, based on the steering angle θs, the vehicle speed V, and the steering velocity ωs. Correcting the first assist controlled variable $I_{as1}^*$ by using the compensation amount $I_8^*$ causes an assist force in such a direction that returns the steering wheel 21 to the neutral position to be generated according to the compensation amount $I_8^*$. For example, this compensates for the deficiency of self-aligning torque due to a road surface reaction force, which restrains such an event that the steering wheel 21 does not fully return to the neutral position. Moreover, this improves a steering feel the driver has when making small steering movements based on the neutral position.

The second guard process circuit 76 will be described in detail below. As shown in FIG. 8, the second guard process circuit 76 has a first limiter 121, a second limiter 122, a third limiter 123, and an adder 124.

The first limiter 121 receives at predetermined sampling intervals the compensation amount $I_6^*$ calculated by the steering wheel returnability control circuit 111 and compares the received compensation amount $I_6^*$ with the upper limit $I_{th}$ and the lower limit $-I_{th}$. The first limiter 121 limits the compensation amount $I_6^*$ to the upper limit Ith if the compensation amount $I_6^*$ exceeds the upper limit $I_{th}$ in the positive direction, and limits the compensation amount $I_6^*$ to the lower limit $-I_{th}$ if the compensation amount $I_6^*$ exceeds the lower limit $-I_{th}$ in the negative direction.

The upper limit $I_{th}$ and the lower limit $-I_{th}$ are set so as to ensure the level of reliability required for the ECU 40 of the electric power steering system 10 (required level of reliability). The upper limit $I_{th}$ and the lower limit $-I_{th}$ are set based on the maximum value (absolute value) of the compensation amount permitted in terms of ensuring the required level of reliability. Similarly, the variation limiting value $\delta I$ is also set based on the maximum variation permitted in terms of ensuring the required level of reliability.

Figure 9:
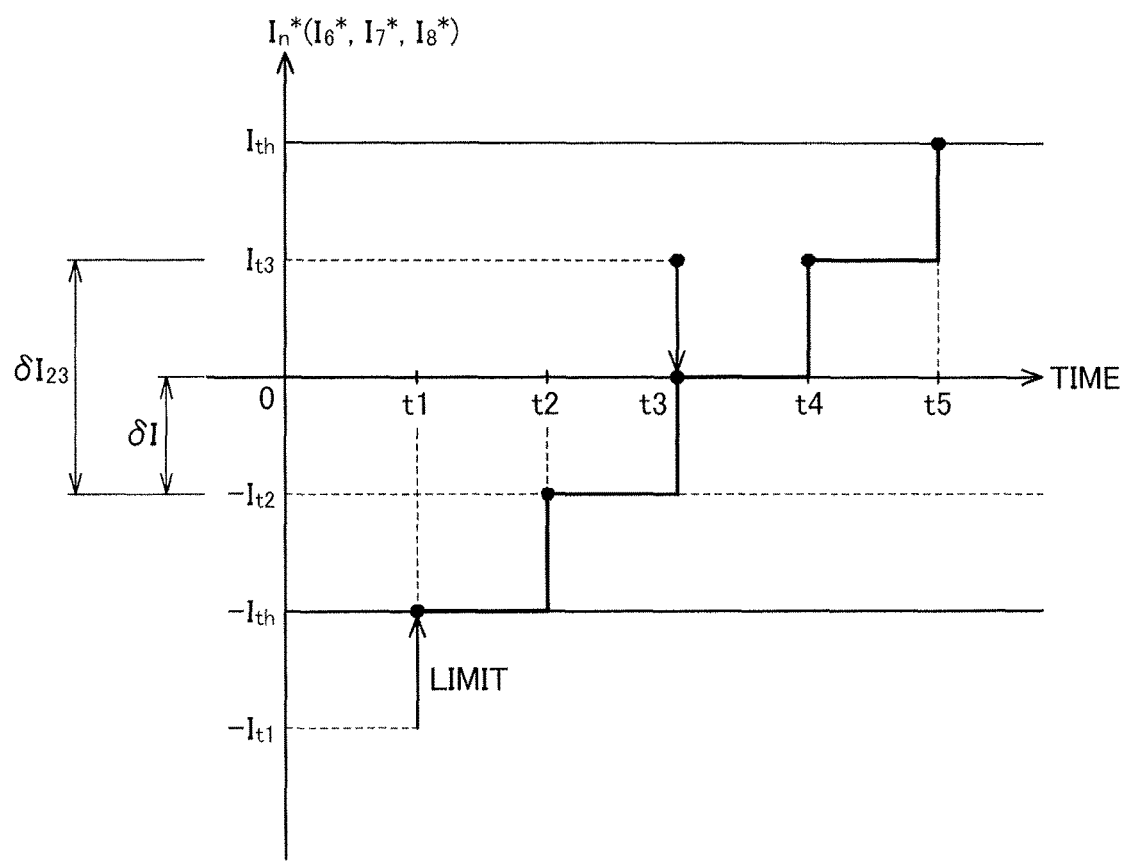
FIG. 9 is a graph showing an example of how a compensation amount, or a basic component of a second assist controlled variable, is limited in the second guard process circuit of the first embodiment.

For example, as shown in the graph of FIG. 9, if the value of the compensation amount $I_6^*$ at time t1 is a value $-I_{t1}$ that exceeds the lower limit $-I_{th}$ in the negative direction, the value of the compensation amount $I_6^*$ is limited to the lower limit $-I_{th}$. Although not shown in the figure, if the compensation amount $I_6^*$ has a value that exceeds the upper limit $I_{th}$ in the positive direction, the value of the compensation amount $I_6^*$ is limited to the upper limit $I_{th}$.

The first limiter 121 performs the variation limiting process based on the variation limiting value $\delta I$. That is, the first limiter 121 calculates the difference between the current compensation amount $I_6^*$ and the previous compensation amount $I_6^*$ to compare the absolute value of the calculated difference with the variation limiting value $\delta I$. If the absolute value of the difference is larger than the variation limiting value $\delta I$, the first limiter 121 uses the sum of the previous compensation amount $I_6^*$ and the variation limiting value $\delta I$ as a current compensation amount $I_6^*$. That is, a variation in compensation amount $I_6^*$ per unit time is limited to at most the variation limiting value $\delta I$. If the absolute value of the difference is not larger than the variation limiting value $\delta I$, the first limiter 121 uses the current compensation amount $I_6^*$ as it is. This will be specifically described below with respect to an example in which the variation limiting value $\delta I$ is set to one half of the absolute value of the lower limit $-I_{th}$ (which is also one half of the upper limit $I_{th}$ in this example).

As shown in the graph of FIG. 9, it is herein assumed that the previous (time t2) compensation amount $I_6^*$ has a negative value $-I_{t2}$, the current (time t3) compensation amount $I_6^*$ has a positive value $I_{t3}$, and the value $-I_{t2}$ is equal to one half of the lower limit $-I_{th}$ and the value $I_{t3}$ is equal to one half of the variation upper limit $I_{th}$. In this case, the difference $\delta I_{23}$ between the current value $I_{t3}$ and the previous value $-I_{t2}$ is equal to twice the variation limiting value $\delta I$. Namely, the difference $\delta I_{23}$ exceeds the variation limiting value $\delta I$. Accordingly, the sum of the previous value $-I_{t2}$ of the compensation amount $I_6^*$ and the variation limiting value $\delta I$, which is zero, is used as a current compensation amount $I_6^*$.

The second limiter 122 and the third limiter 123 perform a process similar to that of the first limiter 121 on the compensation amount $I_7^*$ and the compensation amount $I_8^*$. Accordingly, detailed description of the process of limiting the compensation amount $I_7^*$, $I_8^*$ based on the upper and lower limits $I_{th}$, $-I_{th}$ and the variation limiting process, or the process of limiting a variation in compensation amount $I_7^*$, $I_8^*$ per unit time based on the variation limiting value $\delta I$, which are performed by the second and third limiters 122, 123, will be omitted. The adder 124 adds the compensation amounts $I_6^*$, $I_7^*$, and $I_8^*$ received from the first to third limiters 121 to 123 together to produce the second assist controlled variable $I_{as2}^*$ Reliability of the limiting function of the ECU 40 for various controlled variables having abnormal values will be described below.

ISO 26262 is an automotive functional safety standard. ISO 26262 is intended for not only in-vehicle electronic systems but also their components such as electronic equipment, electronic control units, and software. In ISO 26262, each hazardous event (hazard) caused by malfunctioning of an electronically controlled system is assigned an Automotive Safety Integrity Level (ASIL), or an index for evaluating a hazard, based on three parameters (severity, probability of exposure, and controllability) obtained from the evaluation result of the hazardous event. The ASIL has five levels, Quality Management (QM), A, B, C, and D, with QM being the least stringent and D the most stringent. "QM" means normal quality management that need not apply specific functional safety (safety functions or safety measures required to avoid unacceptable risks). When designing a system, the ASIL level corresponding to the system is determined, and safety measures according to the ASIL level need be taken. The degree of safety measures required is QM<A<B<C<D, with QM being the lowest and D the highest.

The safety measures according to the ASIL may therefore be required for the electric power steering system 10. Since the electric power steering system 10 has an important function to steer the vehicle, safety or reliability is required especially for the electric power steering system 10 among the components of the vehicle. The safety measures according to the ASIL are also required for the ECU 40 and the electronic control functions of the ECU 40. Such electronic control functions include the limiting function for the first assist controlled variable $I_{as1}^*$ and the compensation amount $I_n^*$ having abnormal values.

The technical meaning of the second guard process circuit will be described. In order to ensure reliability of the limiting function of the ECU 40, various state quantities that are used to perform the limiting function need also be reliable. For example, if limiting values are calculated based on a limit map corresponding to the state quantity that does not meet the level of reliability required for the ECU 40 (required level of reliability), the calculated limiting values do not meet the required level of reliability.

The reliability level (in this example, ASIL) of the sensors that detect various state quantities may vary depending on the specifications defined by the vehicle manufacturers, etc. Accordingly, the electrical signals detected by the various sensors, or the state quantities, may include a state quantity that does not have the level of reliability required to ensure the required level of reliability of the limiting function of the ECU 40. In this case, the ECU 40 has to perform the limiting function based on the state quality that does not have the required level of reliability.

The state quantities that are used by the ECU 40 to calculate the final assist controlled variable $I_{as}^*$ include the steering torque $\tau$, the steering angle $\theta s$, the steering torque differential value $d\tau$, the steering velocity $\omega s$, and the vehicle speed V. Among these, the steering torque $\tau$, the steering angle $\theta s$, the steering torque differential value $d\tau$, and the steering velocity $\omega s$ greatly affect calculation of the assist controlled variable $I_{as}^*$. The vehicle speed V affects calculation of the assist controlled variable $I_{as}^*$ less than the other state quantities such as the steering torque $\tau$. The steering torque differential value $d\tau$ is calculated based on the steering torque $\tau$. The steering velocity $\omega s$ is calculated based on the rotation angle $\theta m$ of the motor 31. A higher level of reliability is therefore required for the torque sensor 53 that detects the steering torque $\tau$, the steering sensor 52 that detects the steering angle $\theta$s, and the rotation angle sensor 54 that detects the rotation angle $\theta$m of the motor 31.

For example, the ASIL levels for the torque sensor 53, the steering sensor 52, and the rotation angle sensor 54 and the ASIL levels for the steering torque $\tau$, the steering angle $\theta$s, and the rotation angle $\theta$m, or the state quantities (electrical signals) that are detected by these sensors, are set as follows. The torque sensor 53 and the rotation angle sensor 54 are assigned ASIL-D, the vehicle speed sensor 51 is assigned ASIL-B or ASIL-C, and the steering sensor 52 is assigned ASIL-QM. Accordingly, the steering torque $\tau$ and the rotation angle $\theta$m are assigned ASIL-D, the vehicle speed V is assigned ASIL-B or ASIL-C, and the steering angle $\theta$s is assigned ASIL-QM. The steering torque differential value d$\tau$ obtained from the steering torque $\tau$ and the steering velocity $\omega$s obtained from the rotation angle $\theta$m are assigned ASIL-D.

The torque sensor 53 and the rotation angle sensor 54 meet the required level of reliability by, e.g., using a redundant (duplicate) sensor circuit etc. The steering sensor 52 may not be able to satisfy the requirements of ASIL-A to ASIL-D because it is a relative angle sensor or due to the specifications defined by the vehicle manufacturers, etc.

Accordingly, in this example, the limiting process using the limit map is not performed on the compensation amounts $I_6^*$, $I_7^*$, and $I_8^*$ calculated by using the steering angle $\theta$s. That is, the second assist control circuit 75 including the steering wheel returnability control circuit 111, the steering wheel return speed control circuit 112, and the steering wheel return control circuit 113 which calculate the compensation amounts $I_6^*$, $I_7^*$, and $I_8^*$ by using the steering angle $\theta$s is provided independently of the first assist control circuit 72. Moreover, the second guard process circuit 76 including the first to third limiters 121 to 123 is provided to individually limit the compensation amounts $I_6^*$, $I_7^*$, and $I_8^*$ having abnormal values. As to the compensation amount $I_6^*$, the steering wheel returnability control circuit 111 has a logic which outputs $I_6^*$ of small absolute value. If the compensation amount $I_6^*$ is limited by a limiter, the affect on the assist controlled variable $I_{as}^*$ is small. Therefore, the steering wheel returnability control circuit 111 is included in the second assist control circuit 75, the first limiter 121 is provided in the second guard process circuit 76 so as to individually limit the compensation amounts $I_6^*$ having abnormal value.

The second guard process circuit 76 performs a simple limiting process using the predetermined upper and lower limits $I_{th}$, $-I_{th}$. The upper and lower limits $I_{th}$, $-I_{th}$ are fixed values that are set so as to meet the required level of reliability. The level of reliability of the limiting process that is performed on the compensation amounts $I_6^*$, $I_7^*$, and $I_8^*$ by the second guard process circuit 76 is therefore not affected by the level of reliability of the steering angle $\theta$s (in this example, ASIL-QM). The same applies to the variation limiting value $\delta$I that restrains an abrupt change in compensation amount $I_6^*$, $I_7^*$, and $I_8^*$. The second assist controlled variable $I_{as2}^*$ that is calculated based on the compensation amounts $I_6^*$, $I_7^*$, and $I_8^*$ meets the required level of reliability. The final assist controlled variable $I_{as}^*$ that is obtained by adding the first assist controlled variable $I_{as1}^*$ and the second assist controlled variable $I_{as2}^*$ together also meets the required level of reliability.

The functions of the ECU 40 configured as described above will be described. The ECU 40 limits the range of variation in first assist controlled variable $I_{as1}^*$ (which is calculated by using the steering torque $\tau$, the steering torque differential value d$\tau$, and the steering velocity $\omega$s, or the signals (state quantities) for which the required level of reliability (ASIL-D)) is ensured, by using the final limiting values ($I_{UL}^*$, $I_{LL}^*$) calculated based on the first to third limit maps M1 to M3.

More specifically, the ECU 40 individually sets for each signal the limiting values for limiting the range of variation in first assist controlled variable $I_{as1}^*$ according to the value of each signal ($\tau$, d$\tau$, $\omega$s) used to calculate the first assist controlled variable $I_{as1}^*$. The ECU 40 calculates the sums of the limiting values individually set for each signal and uses the sums as the final limiting values ($I_{UL}^*$, $I_{LL}^*$) for the first assist controlled variable $I_{as1}^*$.

The limiting values (upper and lower limits) individually set for each signal are reflected on the final upper and lower limits $I_{UL}^*$, $I_{LL}^*$. Namely, even if the calculated first assist controlled variable $I_{as1}^*$ has an abnormal value, the first assist controlled variable $I_{as1}^*$ having the abnormal value is limited to an appropriate value according to each signal value by the final limiting values ($I_{UL}^*$, $I_{LL}^*$). The final assist controlled variable $I_{as}^*$ and the current command value I* are calculated by using the first assist controlled variable $I_{as1}^*$ having the appropriate value.

Since the limiting values are individually set for each signal for which the required level of reliability (ASIL-D) is ensured, these individually set limiting values and the sums of these limiting values, namely the final limiting values ($I_{UL}^*$, $I_{LL}^*$), also meet the required level of reliability. The limiting function for the first assist controlled variable $I_{as1}^*$ having an abnormal value therefore also meets the required level of reliability. Accordingly, the first assist controlled variable $I_{as1}^*$ having an abnormal value can be limited more appropriately. Moreover, the level of reliability of the first assist controlled variable $I_{as1}^*$ can be ensured.

Regarding the compensation amount $I_n^*$ ($I_6^*$, $I_7^*$, $I_8^*$) for the steering wheel returnability which is calculated by using the steering angle $\theta$s, or the signal (state quantity) for which safety (ASIL-A to ASIL-D) is not ensured, the ECU 40 limits the range of variation in compensation amount $I_n^*$ itself by using the upper and lower limits $I_{th}$, $-I_{th}$. The ECU 40 limits a variation in compensation amount $I_n^*$ itself per unit time by using the variation limiting value $\delta$I.

The upper and lower limits $I_{th}$, $-I_{th}$ are fixed values that are set so as to meet the required level of reliability. The level of reliability of the limiting process for the compensation amounts $I_6^*$, $I_7^*$, and $I_8^*$ is therefore not affected by the level of reliability of the steering angle $\theta$s (in this example, ASIL-QM). The same applies to the variation limiting value $\delta$I that restrains an abrupt change in compensation amounts $I_6^*$, $I_7^*$, and $I_8^*$. The compensation amount $I_n^*$ having an abnormal value is thus appropriately limited without being affected by the level of reliability of the steering angle $\theta$s. The level of reliability of the second assist controlled variable $I_{as2}^*$ that is calculated based on the compensation amounts $I_6^*$, $I_7^*$, and $I_8^*$ is therefore ensured.

The final assist controlled variable $I_{as}^*$ is obtained by adding together the first assist controlled variable $I_{as1}^*$ that meets the required level of reliability and the second assist controlled variable $I_{as2}^*$ that meets the required level of reliability. This shows that the final assist controlled variable $I_{as}^*$ is not affected by the level of reliability of the steering angle $\theta$s, and the final assist controlled variable $I_{as}^*$ and the current command value I* that is calculated based on the final assist controlled variable $I_{as}^*$ meet the required level of reliability.

Since the current command value I* meeting the required level of reliability is supplied to the motor control signal generation circuit 62, a more appropriate assist force is applied to the steering mechanism 20. Moreover, the limiting function for the first assist controlled variable $I_{as1}^*$ having an abnormal value and the limiting function for the compensation amount $I_n^*$ having an abnormal value are performed appropriately. This restrains the assist controlled variable $I_{as}^*$ having an abnormal value from being calculated and thus restrains the current command value I* having an abnormal value from being calculated. Since the current command value I* having an abnormal value is restrained from being supplied to the motor control signal generation circuit 62, an unintended assist force is restrained from being applied to the steering mechanism 20.

If the first assist controlled variable $I_{as1}^*$ has been limited for a certain period of time, the backup assist controlled variable $I_{asbk}^*$ is used instead of the final assist controlled variable $I_{as}^*$ that is calculated by using the first assist controlled variable $I_{as1}^*$. Although the backup assist controlled variable $I_{asbk}^*$ is obtained by simpler calculation than the assist controlled variable $I_{as}^*$, steering assistance is continued by using the backup assist controlled variable $I_{asbk}^*$. Since the calculation is simple, miscalculation of the backup assist controlled variable $I_{asbk}^*$, etc. is less likely to occur. It is therefore preferable to use the backup assist controlled variable $I_{asbk}^*$ in case of an abnormal condition of the first assist controlled variable $I_{as1}^*$ etc.

The first embodiment has the following effects.

(1) The range of variation in first assist controlled variable $I_{as1}^*$ that is calculated by using the steering torque τ, the steering torque differential value dτ, and the steering velocity ωs, or the state quantities meeting the required level of reliability (ASIL-D), is limited by the final limiting values ($I_{UL}^*$, $I_{LL}^*$) that are calculated based on the first to third limit maps M1 to M3. The range of variation in compensation amount $I_n^*$ ($I_6^*$, $I_7^*$, $I_8^*$) that is calculated by using the steering angle θs, or the state quantity not meeting the required level of reliability (ASIL-A to ASIL-D), is limited by the predetermined upper and lower limits $I_{th}$, $-I_{th}$. A variation in compensation amount $I_n^*$ per unit time is limited by the predetermined variation limiting value δI. The use of this configuration allows the limiting function for the first assist controlled variable $I_{as1}^*$ and the limiting function for the compensation amount $I_n^*$ to be appropriately performed even if the plurality of kinds of state quantities (τ, dτ, ωs, θs) that are used to calculate the assist controlled variable $I_{as1}^*$ and the current command value I* include a state quantity (θs) that does not meet the required level of reliability.

(2) The final assist controlled variable $I_{as}^*$ is produced by adding the first assist controlled variable $I_{as1}^*$ and the second assist controlled variable $I_{as2}^*$ together. If the first assist controlled variable $I_{as1}^*$ has been limited for a certain period of time, the backup assist controlled variable $I_{asbk}^*$ is used instead of the assist controlled variable $I_{as}^*$. The limited first assist controlled variable $I_{as1}^*$ may continue to be used. In some cases, however, the limited first assist controlled variable $I_{as1}^*$ is requested to be completely switched to the backup assist controlled variable $I_{asbk}^*$, depending on the specifications of the vehicle etc. The ECU 40 of the present embodiment can meet such a request in a preferable manner. The calculation load of the microcomputer 42 at the time of backup assistance can be restrained by using only the backup assist controlled variable $I_{asbk}^*$ obtained by simplified calculation.

(3) The ranges of change in compensation amounts $I_6^*$, $I_7^*$, and $I_8^*$ that are calculated by using the steering angle θs, or the state quality not meeting the required level of reliability, are individually limited by the first limiter 121, the second limiter 122, and the third limiter 123. A more precise limiting process can be performed on the compensation amounts $I_6^*$, $I_7^*$, and $I_8^*$ and the second assist controlled variable $I_{as2}^*$.

A second embodiment of the steering control device will be described. The second embodiment is different form the first embodiment in the position where the second assist controlled variable is added. The configuration of the second embodiment is basically similar to that of the first embodiment shown in FIGS. 1 to 9.

As described above, when the first assist controlled variable $I_{as1}^*$ has been limited for a certain period of time, steering assistance is continued by using only the backup assist controlled variable $I_{asbk}^*$ instead of the assist controlled variable $I_{as}^*$. However, the backup assist controlled variable $I_{asbk}^*$ is obtained by simpler calculation than the assist controlled variable $I_{as}^*$. The steering assist performance that is achieved by the steering assistance based on the backup assist controlled variable $I_{asbk}^*$ is therefore lower than the steering assist performance that is achieved by the steering assistance based on the assist controlled variable $I_{as}^*$. Accordingly, the present embodiment uses the following configuration.

Figure 10:
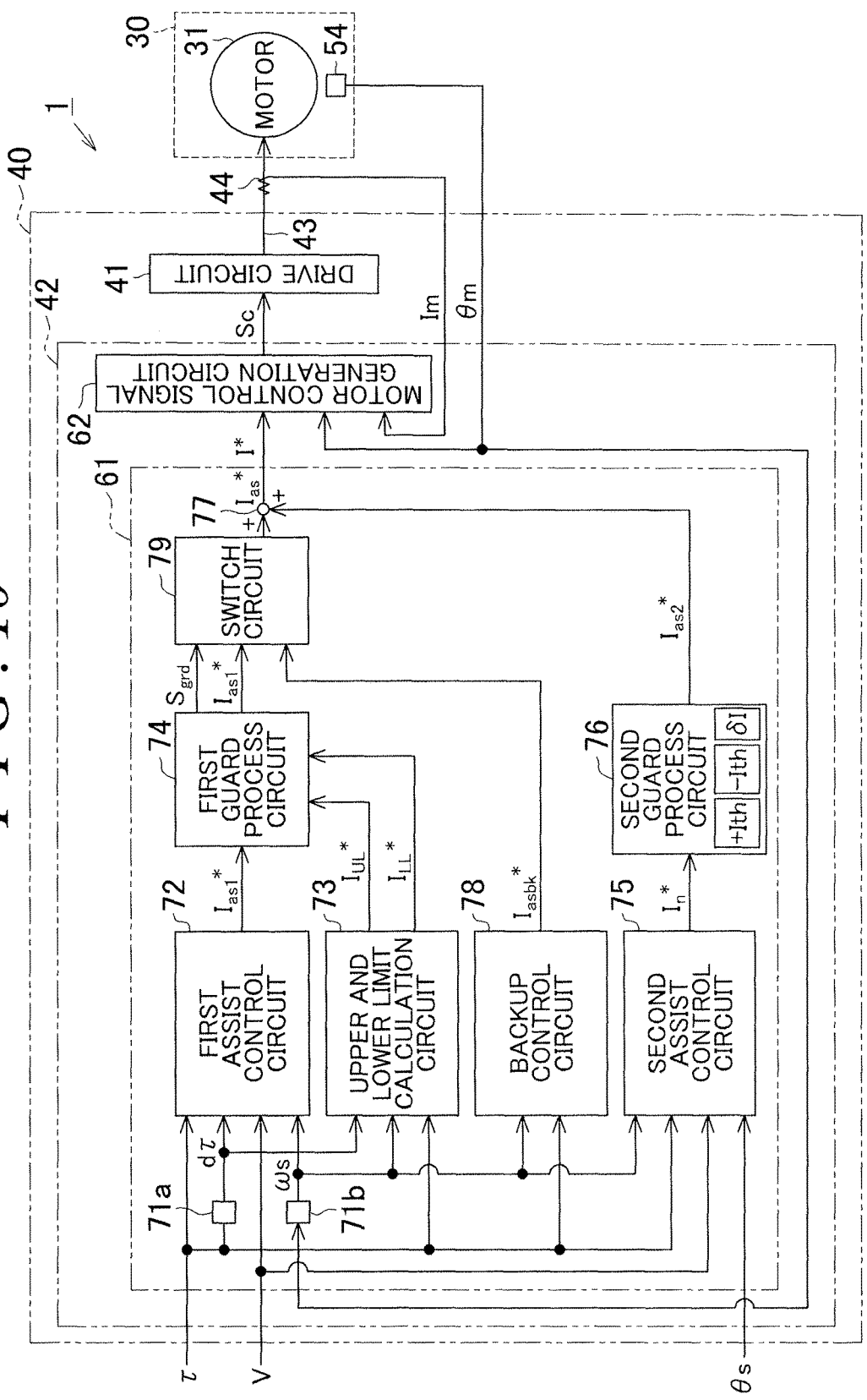
FIG. 10 is a control block diagram showing a third embodiment of the electronic control unit.

As shown in FIG. 10, the adder 77 is provided in the stage subsequent to the switch circuit 79 in a path for calculation of the current command value I*, namely between the switch circuit 79 and the motor control signal generation circuit 62. Accordingly, the second assist controlled variable $I_{as2}^*$ is added to the first assist controlled variable $I_{as1}^*$ output from the switch circuit 79. The final assist controlled variable $I_{as}^*$ has the same value as in the first embodiment in which the second assist controlled variable $I_{as2}^*$ is added to the first assist controlled variable $I_{as1}^*$ in the stage previous to the switch circuit 79.

However, if the first assist controlled variable $I_{as1}^*$ has been limited for a certain period of time, the switch circuit 79 uses the backup assist controlled variable $I_{asbk}^*$ instead of the first assist controlled variable $I_{as1}^*$. The final assist controlled variable $I_{as}^*$ is therefore produced by adding the second assist controlled variable $I_{as2}^*$ to the backup assist controlled variable $I_{asbk}^*$. The current command value I* is calculated based on the final assist controlled variable $I_{as}^*$.

The second embodiment has the following effect in addition to the effects (1), (3) of the first embodiment.

(4) Since the second assist controlled variable $I_{as2}^*$ is added to the backup assist controlled variable $I_{asbk}^*$, the steering assist performance is improved accordingly. In particular, the second assist controlled variable $I_{as2}^*$ is the sum of the compensation amounts $I_n^*$ ($I_6^*$, $I_7^*$, and $I_8^*$) regarding the steering wheel returnabiltiy, the steering wheel returnability at the time of backup assistance is improved.

This can improve a steering feel at the time of backup assistance.

A third embodiment of the steering control device will be described. The third embodiment is different from the first embodiment in that the backup assist function is omitted. The configuration of the third embodiment is basically similar to that of the first embodiment shown in FIGS. 1 to 9. The third embodiment is also applicable to the second embodiment.

In the present embodiment, the backup control circuit 78 and the switch circuit 79 shown in FIG. 2 are omitted. Accordingly, the current command value I* based on the backup assist controlled variable $I_{asbk}^*$ is not calculated, and only the current command value I* based on the final assist controlled variable $I_{as}^*$ is supplied to the motor control signal generation circuit 62. In the case where the ECU 40 is not provided with the backup assist function, the first guard process circuit 74 may not have the function to generate the limiting state signal $S_{grd}$ that indicates whether the first assist controlled variable $I_{as1}*$ has been limited or not.

If an abnormal condition has lasted for a certain period of time, namely if the first assist controlled variable $I_{as1}*$ has been limited to the upper limit $I_{UL}*$ or the lower limit $I_{LL}*$ for a certain period of time, the first guard process circuit 74 performs a process of gradually reducing the first assist controlled variable $I_{as1}*$ toward zero. This will be specifically described below.

Figure 11:
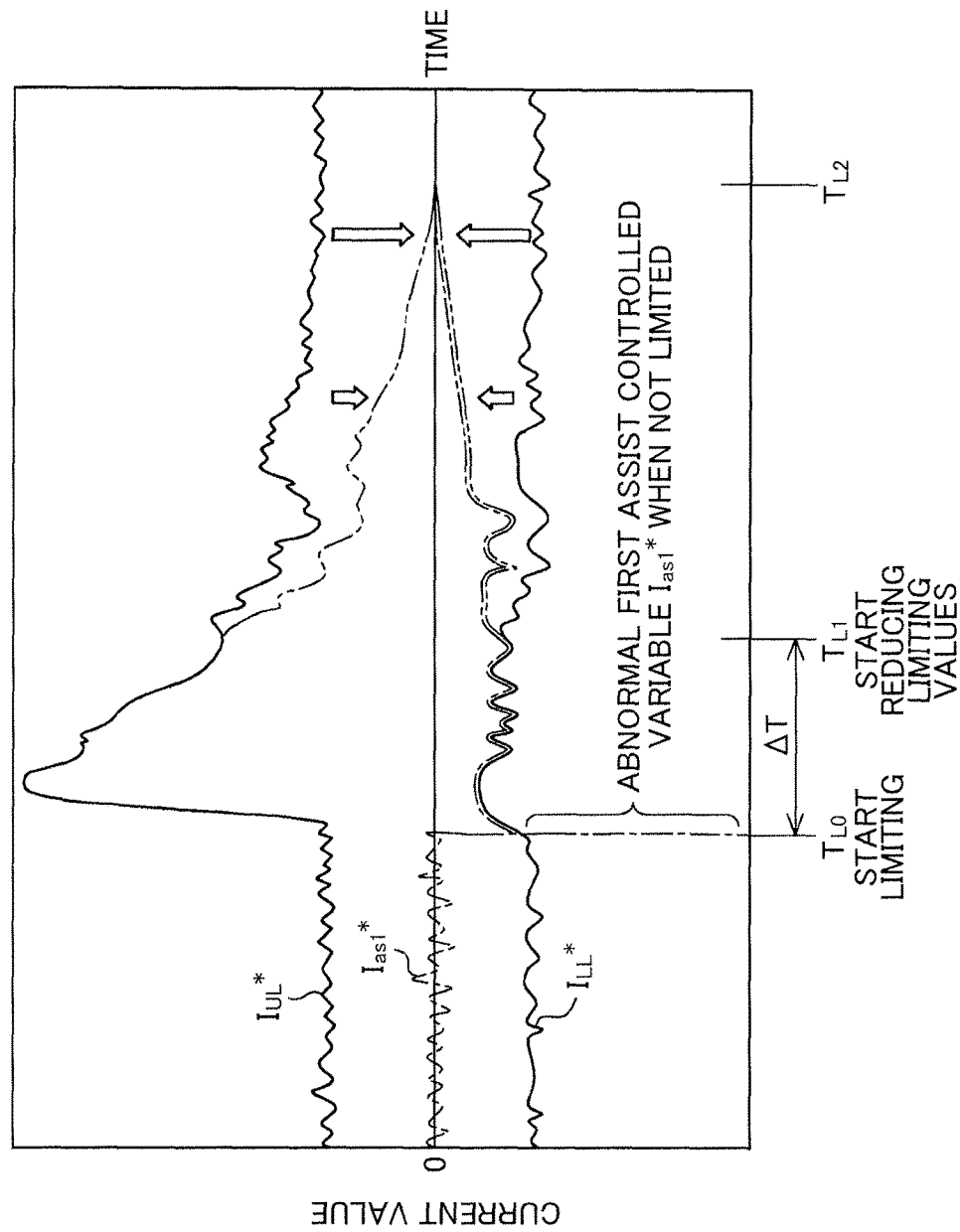
FIG. 11 is a graph showing an example of how a first assist controlled variable having an abnormal value is limited in a fourth embodiment of the electronic control unit.

As shown in the graph of FIG. 11, for example, if the first assist controlled variable $I_{as1}*$ is smaller than the lower limit $I_{LL}*$ (at time $T_{L0}$), the first assist controlled variable $I_{as1}*$ is limited to the lower limit $I_{LL}*$. If the first assist controlled variable $I_{as1}*$ has been limited to the lower limit $I_{LL}*$ for a certain period of time $\Delta T$ (at time $T_{L1}$), the first guard process circuit 74 gradually reduces the lower limit $I_{LL}*$ toward zero. In this example, the first assist controlled variable $I_{as1}*$ becomes equal to zero at the timing the lower limit $I_{LL}*$ reaches zero (at time $T_{L2}$). The same applies to the case where the first assist controlled variable $I_{as1}*$ is larger than the upper limit $I_{UL}*$. That is, if the first assist controlled variable $I_{as1}*$ has been limited to the upper limit $I_{UL}*$ for the certain period of time $\Delta T$, the first guard process circuit 74 gradually reduces the upper limit $I_{UL}*$ toward zero. This process of gradually reducing the first assist controlled variable $I_{as1}*$ toward zero is forcibly performed regardless of the process of calculating the upper and lower limits $I_{UL}*$, $I_{LL}*$.

If the first assist controlled variable $I_{as1}*$ reaches zero, the second assist controlled variable $I_{as1}*$ still serves as the final assist controlled variable $I_{as}*$, and the current command value I* that is calculated based on this small assist controlled variable $I_{as}*$ is supplied to the motor control signal generation circuit 62. Slight steering assistance is therefore continued.

In the case where application of an assist force is requested to be completely stopped if the abnormal condition has lasted for the certain period of time $\Delta T$, the second guard process circuit 76 may have a gradual reduction function similar to that of the first guard process circuit 74. In this case, the second guard process circuit 76 determines whether the first assist controlled variable $I_{as1}*$ has been limited or not based on the limiting state signal $S_{grd}$ generated by the first guard process circuit 74. If it is determined that the first assist controlled variable $I_{as1}*$ has been limited for a certain period of time, the second guard process circuit 76 forcibly reduces the upper limit $I_{th}$ or the lower limit $-I_{th}$ for the compensation amount $I_n*$ toward zero.

The final assist controlled variable $I_{as}*$, which is the sum of the first assist controlled variable $I_{as1}*$ and the second assist controlled variable $I_{as2}*$, decreases gradually and eventually reaches zero. When the steering assistance is completely stopped, an assist force that is applied to the steering mechanism 20 decreases gradually. This restrains an abrupt change in steering feel, whereby improved safety is achieved.

In the case where the second assist controlled variable $I_{as2}*$ contributes to (affects) the final assist controlled variable $I_{as}*$ only to a small extent, the second guard process circuit 76 may limit the second assist controlled variable $I_{as2}*$ directly to zero instead of gradually reducing the second assist controlled variable $I_{as2}*$ toward zero, or may stop outputting the second controlled variable $I_{as2}*$.

The following process may be performed if the continuance of the steering assistance is prioritized etc. The first guard process circuit 74 keeps limiting the first assist controlled variable $I_{as1}*$ to the upper limit $I_{UL}*$ or the lower limit $I_{LL}*$ as long as the abnormal condition of the first assist controlled variable $I_{as1}*$ continues. The second guard process circuit 76 also keeps limiting the compensation amount $I_n*$ to the upper limit $I_{th}$ or the lower limit $-I_{th}$ as long as the abnormal condition of the compensation amount $I_n*$ ($I_6*$, $I_7*$, $I_8*$) continues. Even with at least one of the first assist controlled variable $I_{as1}*$ and the second assist controlled variable $I_{as2}*$ based on the compensation amount $I_n*$ being limited, the current command value I* calculated based on the final assist controlled variable $I_{as}*$ is continuously supplied to the motor control signal generation circuit 62.

The third embodiment has the following effect in addition to the effects (1), (3) of the first embodiment.

(5) Since the backup control circuit 78 and the switch circuit 79 are omitted, the configuration of the microcomputer 42 can be simplified accordingly.

A fourth embodiment of the steering control device will be described. The configuration of the fourth embodiment is basically similar to that of the first embodiment shown in FIGS. 1 to 9. The fourth embodiment is also applicable to the first to third embodiments.

In recent years, functional demands for the electric power steering system 10 have been increasingly diversified. The microcomputer 42 calculates the assist controlled variable $I_{as}*$ by using various state quantities indicating the steering state of the steering steering state or the traveling state of the vehicle. However, the state quantities to be used to calculate the assist controlled variable $I_{as}*$ may vary depending on the product specifications etc. This will be described below.

Figure 12:
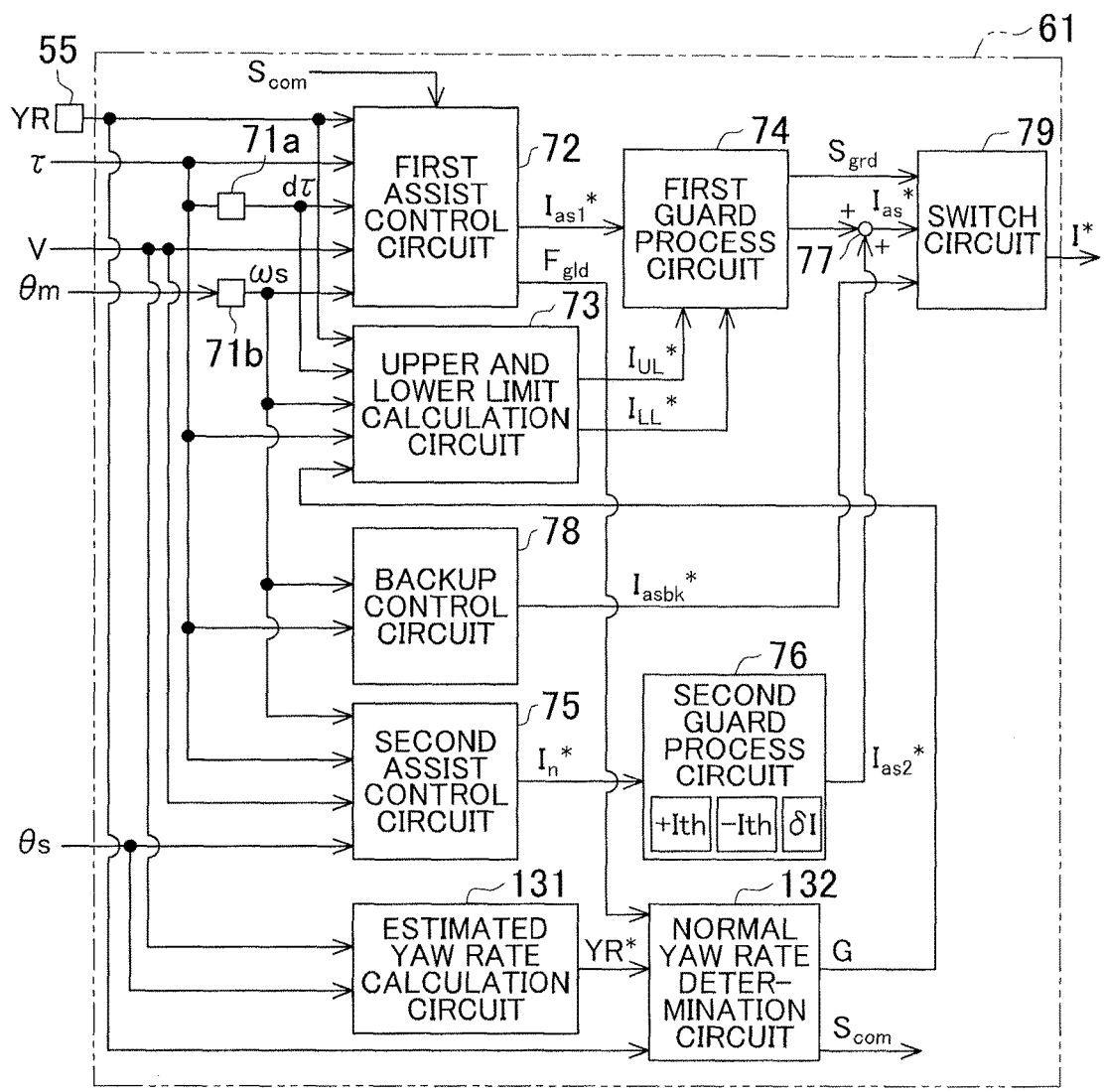
FIG. 12 is a control block diagram of a current command value calculation circuit of the electronic control unit according to the fourth embodiment.

As shown in FIG. 12, the first assist control circuit 72 receives a yaw rate YR detected by an in-vehicle yaw rate sensor 55 as a state quantity indicating a vehicle behavior, and calculates the first assist controlled variable $I_{as1}*$ in view of the received yaw rate YR. The first assist control circuit 72 has a grip loss determining function. The first assist control circuit 72 determines whether grip loss (any tire having no grip on the road surface) has occurred or not based on the yaw rate YR. The first assist control circuit 72 sets a grip loss determination flag $F_{gld}$ to one (truth) or zero (false) according to the determination result and holds the grip loss determination flag $F_{gld}$. The first assist control circuit 72 sets the grip loss determination flag $F_{gld}$ to one if it is determined that grip loss has occurred. The first assist control circuit 72 sets the grip loss determination flag $F_{gld}$ to zero if it is determined that grip loss has not occurred.

Like the steering angle θs, safety (ASIL-A to ASIL-D) may not be ensured for the yaw rate sensor 55 and the actual yaw rate YR that is detected by the yaw rate sensor 55. In this case, reliability of the actual yaw rate YR need also be ensured in order to ensure reliability of the first assist controlled variable $I_{as1}*$. The current command value calculation circuit 61 therefore has the following configuration.

As shown in FIG. 12, the current command value calculation circuit 61 includes an estimated yaw rate calculation circuit 131 and a normal yaw rate determination circuit 132. The estimated yaw rate calculation circuit 131 calculates an estimated yaw rate YR* based on the steering angle θs and the vehicle speed V.

The estimated yaw rate YR* is given by the following expression (A).

$$YR* = V \cdot \delta / ((l + K \cdot V^2) \cdot l) \tag{A}$$

where "V" represents the vehicle speed, "δ" represents the tire angle (rad), "l" represents the wheelbase (m), and "K" represents the stability factor. The stability factor refers to a constant indicating basic turning characteristics of the vehicle during steady state circular turning at a constant steering angle θs.

The tire angle δ is given by the following expression (B).

$$\delta = gr \cdot \theta s \quad \text{(B)}$$

The following expression (C) is obtained by applying the expression (B) to the expression (A). The estimated yaw rate calculation circuit 131 calculates the estimated yaw rate YR* by using the expression (C).

$$YR^* = V \cdot (gr \cdot \theta s)/((l+K \cdot V^2)-l) \quad \text{(C)}$$

where "gr" represents the gear ratio, or the ratio between the number of rack teeth on the rack shaft 23 and the number of pinion teeth on the pinion shaft 22c, and "θs" represents the steering angle.

The normal yaw rate determination circuit 132 determines whether the actual yaw rate YR detected by the yaw rate sensor 55 is normal or not based the following determination conditions (D), (E).

$$|YR^* - YR| < YR_{th} \quad \text{(D)}$$

$$F_{gld} = 0 \quad \text{(E)}$$

where "YR*" represents the estimated yaw rate calculated by the estimated yaw rate calculation circuit 131, "YR" represents the actual yaw rate detected by the yaw rate sensor 55, and "$YR_{th}$" represents the yaw rate determination threshold. The yaw rate determination threshold $YR_{th}$ is a reference value that is used to determine that the yaw rate YR has a normal value, and is obtained by experiments etc. "$F_{gld}$" represents the grip loss determination flag that is held in the first assist control circuit 72.

If both of the determination conditions (D), (E) are satisfied, the normal yaw rate determination circuit 132 determines that the yaw rate YR has a normal value. If at least one of the determination conditions (D), (E) is not satisfied, the normal yaw rate determination circuit 132 determines that the yaw rate YR has an abnormal value. The normal yaw rate determination circuit 132 generates gain G according to the determination result of whether the yaw rate YR has a normal value or not. If it is determined that the yaw rate YR has a normal value, the normal yaw rate determination circuit 132 sets the gain G to one. If it is determined that the yaw rate YR has an abnormal value, the normal yaw rate determination circuit 132 sets the gain G to zero. The normal yaw rate determination circuit 132 also generates a notification signal $S_{com}$ indicating whether the yaw rate YR is normal or abnormal.

Whether the yaw rate YR is normal or not can be more accurately determined by using the determination condition (E) based on the grip loss determination flag $F_{gld}$. This is because whether the yaw rate YR is normal or not cannot be accurately determined if the vehicle is in an unstable condition such as a sideslip due to grip loss.

Figure 13:
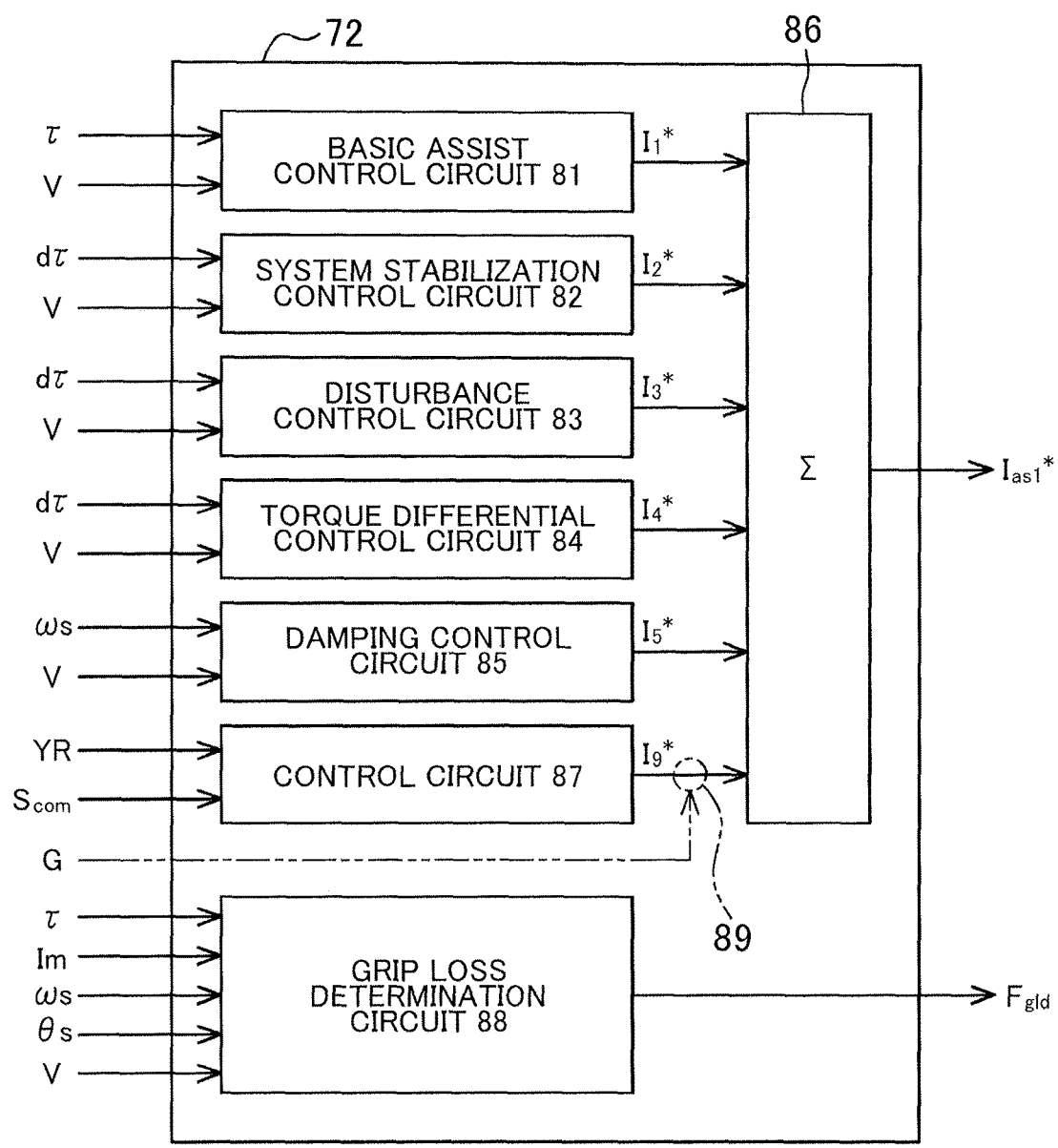
FIG. 13 is a control block diagram of a first assist control circuit of the fourth embodiment.

As shown in FIG. 13, the first assist control circuit 72 includes a control circuit 87 and a grip loss determination circuit 88. The control circuit 87 generates an appropriate compensation amount $I_9^*$ for the basic assist controlled variable $I_1^*$, based on the yaw rate YR detected by the yaw rate sensor 55. The content of the compensation control that is performed by the control circuit 87 is set as appropriate according to the product specifications etc.

The grip loss determination circuit 88 determines whether grip loss has occurred or not. The grip loss determination circuit 88 calculates estimated self-aligning torque $T_e$ based on the steering torque τ, the current value Im detected by the current sensor 44 (to be exact, the motor torque calculated based on the current value Im), and the steering velocity ωs. The grip loss determination circuit 88 also calculates reference self-aligning torque $T_c$ based on the steering angle θs and the vehicle speed V. The grip loss determination circuit 88 calculates a grip level ε by applying the estimated self-aligning torque $T_e$ and the reference self-aligning torque $T_c$ to the following expression (F). The grip level ε refers to the level of lateral grip of the front wheels (in this example, the steered wheels 26) of the vehicle.

$$\varepsilon = T_e / T_c \quad \text{(F)}$$

The grip loss determination circuit 88 determines whether grip loss has occurred or not by comparing the grip level ε with a grip level determination threshold $\varepsilon_{th}$.

If the grip level ε is equal to or higher than the grip level determination threshold $\varepsilon_{th}$ ($\varepsilon \geq \varepsilon_{th}$), the grip loss determination circuit 88 determines that grip loss has not occurred, and clears the grip loss determination flag $F_{gld}$ to zero. If the grip level ε is lower than the grip level determination threshold $\varepsilon_{th}$ ($\varepsilon < \varepsilon_{th}$), the grip loss determination circuit 88 determines that grip loss has occurred, and sets the grip loss determination flag $F_{gld}$ to one.

The first assist control circuit 72 may adjust the first assist controlled variable $I_{as1}^*$ based on the grip level ε calculated by the grip loss determination circuit 88. For example, when the grip level ε is lower than a set value, the first assist control circuit 72 rapidly increases the first assist controlled variable $I_{as1}^*$. The set value is set based on the grip level ε of the case where there is a probability that a sideslip may occur. As an assist force increases rapidly, a force required to operate the steering wheel 21 decreases rapidly, which allows the driver to recognize that there is a probability that a sideslip etc. may occur.

Figure 14:
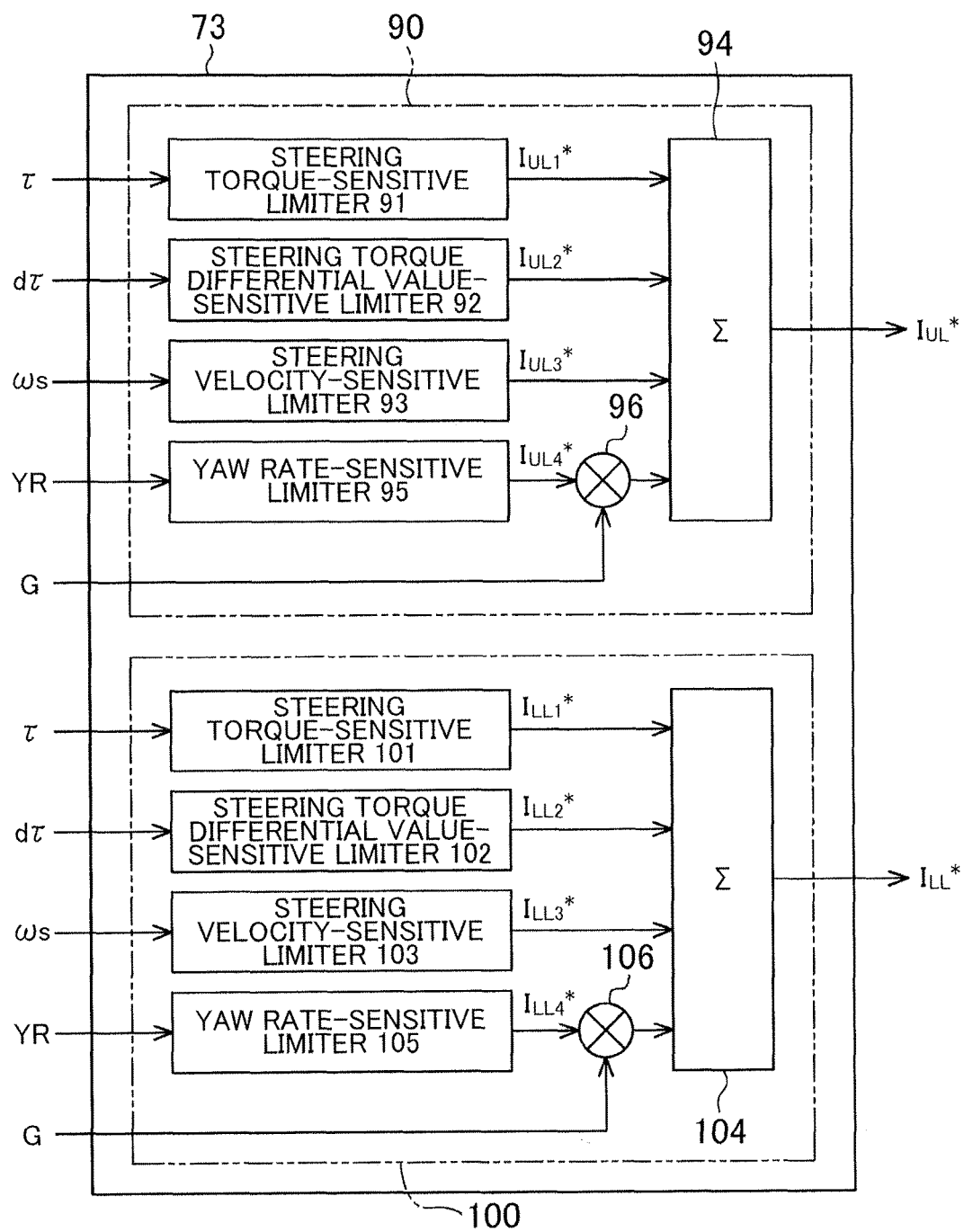
FIG. 14 is a control block diagram of an upper and lower limit calculation circuit of the fourth embodiment.

As shown in FIG. 14, the upper and lower limit calculation circuit 73 also receives the actual yaw rate YR detected by the yaw rate sensor 55. The upper and lower limit calculation circuit 73 calculates the upper limit $I_{UL}^*$ and the lower limit $I_{LL}^*$ as the limiting values for the first assist controlled variable $I_{as1}^*$, based also on the actual yaw rate YR.

The upper limit calculation circuit 90 of the upper and lower limit calculation circuit 73 includes a yaw rate-sensitive limiter 95 and a multiplier 96. The yaw rate-sensitive limiter 95 calculates an upper limit $I_{UL4}^*$ for the first assist controlled variable $I_{as1}^*$ according to the yaw rate YR. The multiplier 96 multiplies the gain G set by the normal yaw rate determination circuit 132 by the upper limit $I_{UL4}^*$ calculated by the yaw rate-sensitive limiter 95 to produce a final upper limit $I_{UL4}^*$. For example, if the gain G is zero, the final upper limit $I_{UL4}^*$ based on the yaw rate YR is zero. If the gain G is one, the upper limit $I_{UL4}^*$ calculated by the yaw rate-sensitive limiter 95 is used as it is as the final upper limit $I_{UL4}^*$ based on the yaw rate YR. The adder 94 adds together the three upper limits $I_{UL1}^*$ to $I_{UL3}^*$ and the upper limit $I_{UL4}^*$ received from the multiplier 96 to generate the upper limit $I_{UL}^*$ for the first assist controlled variable $I_{as1}^*$.

The lower limit calculation circuit 100 of the upper and lower limit calculation circuit 73 has a yaw rate-sensitive limiter 105 and a multiplier 106. The yaw rate-sensitive limiter 105 calculates a lower limit $I_{LL4}^*$ for the assist controlled variable $I_{as}^*$ according to the yaw rate YR. The multiplier 106 multiplies the gain G set by the normal yaw rate determination circuit 132 by the lower limit $I_{LL4}*$ calculated by the yaw rate-sensitive limiter 105 to produce a final lower limit $I_{LL4}*$. For example, if the gain G is zero, the final lower limit $I_{LL4}*$ based on the yaw rate YR is zero. If the gain G is one, the lower limit $I_{LL4}*$ calculated by the yaw rate-sensitive limiter 105 is used as it is as the final lower limit $I_{LL4}*$ based on the yaw rate YR. The adder 104 adds together the three lower limits $I_{LL1}*$ to $I_{LL3}*$ and the lower limit $I_{LL4}*$ received from the multiplier 106 to generate the lower limit $I_{LL}*$ for the first assist controlled variable $I_{as1}*$.

The upper limit calculation circuit 90 and the lower limit calculation circuit 100 uses a fourth limit map M4 to calculate the upper limit $I_{UL4}*$ and the lower limit $I_{LL4}*$. Like the first to third limit maps M1 to M3, the fourth limit map M4 is stored in the storage device, not shown, of the microcomputer 42. The fourth limit map M4 is set so that any first assist controlled variable $I_{as1}*$ calculated according to driver's operation of the steering wheel 21 is considered acceptable and other first assist controlled variables $I_{as1}*$ having abnormal values for any reason are considered unacceptable.

Figure 15:
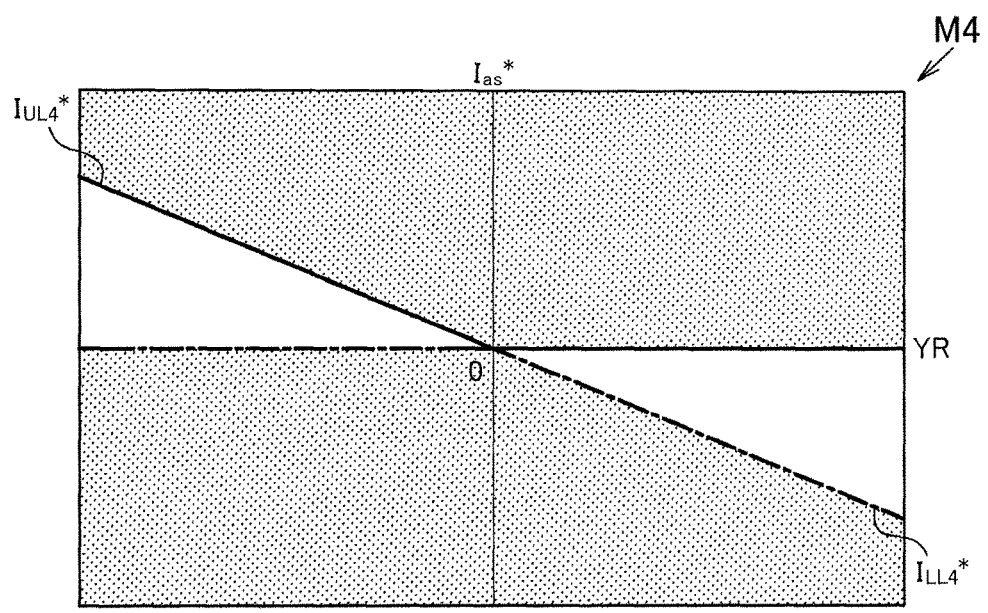
FIG. 15 is a map showing the relationship between a yaw rate and limiting values in the fourth embodiment.

As shown in FIG. 15, the fourth limit map M4 is a map with the yaw rate YR on the abscissa and the first assist controlled variable $I_{as1}*$ on the ordinate. The fourth limit map M4 defines the relationship between the yaw rate YR and the upper limit $I_{UL4}*$ for the first assist controlled variable $I_{as1}*$ and the relationship between the yaw rate YR and the lower limit $I_{LL4}*$ for the first assist controlled variable $I_{as1}*$. The yaw rate-sensitive limiters 95, 105 use the fourth limit map M4 to calculate the upper limit $I_{UL4}*$ and the lower limit $I_{LL4}*$ according to the yaw rate YR.

The fourth limit map M4 has the following characteristics as it is set so that any first assist controlled variable $I_{as1}*$ in the opposite direction (positive or negative sign) to the yaw rate YR is considered acceptable and any first assist controlled variable $I_{as1}*$ in the same direction as the yaw rate YR is considered unacceptable. When the yaw rate YR is positive, the upper limit $I_{UL4}*$ for the first assist controlled variable $I_{as1}*$ is maintained at zero. When the yaw rate YR is positive, the lower limit $I_{LL4}*$ for the first assist controlled variable $I_{as1}*$ increases in the negative direction with an increase in yaw rate YR. When the yaw rate YR is negative, the upper limit $I_{UL4}*$ for the first assist controlled variable $I_{as1}*$ increases in the positive direction with an increase in absolute value of the yaw rate YR. When the yaw rate YR is negative, the lower limit $I_{LL4}*$ for the first assist controlled variable $I_{as1}*$ is maintained at zero.

The fourth embodiment has the following functions and effects.

(6) If the normal yaw rate determination circuit 132 determines that the yaw rate YR is normal, the normal yaw rate YR whose reliability is ensured and the limiting values ($I_{UL4}*$, $I_{LL4}*$) calculated by the yaw rate-sensitive limiters 95, 105 based on this yaw rate YR are used. The upper and lower limits $I_{UL4}*$, $I_{LL4}*$ according to the normal yaw rate YR are thus reflected on the upper and lower limits $I_{UL}*$, $I_{LL}*$, or the final limiting values for the first assist controlled variable $I_{as1}*$. The first assist controlled variable $I_{as1}*$ calculated by taking the compensation amount $I_9*$ based on the yaw rate YR into consideration can be appropriately limited. For example, this restrains erroneous detection (erroneous limitation), namely restrains a correct first assist controlled variable $I_{as1}*$ that should not be limited from being erroneously limited by the final limiting values ($I_{UL}*$, $I_{LL}*$), or restrains failure to limit an abnormal first assist controlled variable $I_{as1}*$ that should be limited.

(7) If the normal yaw rate determination circuit 132 determines that the yaw rate YR is abnormal, the gain G is set to zero, whereby the final limiting values ($I_{UL4}*$, $I_{LL4}*$) calculated by the yaw rate-sensitive limiters 95, 105 are zero. Namely, the upper and lower limit calculation circuit 73 calculates the final limiting values ($I_{UL}*$, $I_{LL}*$) for the first assist controlled variable $I_{as1}*$ without taking the limiting values ($I_{UL4}*$, $I_{LL4}*$) based on the abnormal yaw rate YR into consideration. The limiting values (upper and lower limits $I_{UL4}*$, $I_{LL4}*$) based on the abnormal yaw rate YR therefore do not affect the final limiting values (upper and lower limits $I_{UL}*$, $I_{LL}*$) that are calculated by the upper and lower limit calculation circuit 73.

(8) The normal yaw rate determination circuit 132 generates the notification signal $S_{com}$ indicating whether the yaw rate YR is normal or not. The first assist control circuit 72 receives the notification signal $S_{com}$ generated by the normal yaw rate determination circuit 132. If the received notification signal $S_{com}$ indicates that the yaw rate YR is abnormal, the first assist control circuit 72 stops compensation control based on the yaw rate YR. Specifically, if the notification signal $S_{com}$ indicates that the yaw rate YR is abnormal, the control circuit 87 stops calculation of the compensation amount $I_9*$ for the basic assist controlled variable $I_1*$. At this time, the control circuit 87 need not necessarily stop calculation of the compensation amount $I_9*$ suddenly, but may gradually reduce the compensation amount $I_9*$ toward zero. The compensation amount $I_9*$ calculated based on the abnormal yaw rate YR by the control circuit 87 is therefore zero. Accordingly, the compensation amount $I_9*$ is not used for calculation of the first assist controlled variable $I_{as1}*$, whereby reliability of the first assist controlled variable $I_{as1}*$ can be ensured.

The following configuration may be used to stop compensation control based on the yaw rate YR in the case where the normal yaw rate determination circuit 132 determines that the yaw rate YR is abnormal. The first assist control circuit 72 receives the gain G generated by the normal yaw rate determination circuit 132. As shown by a long dashed double-short dashed line in FIG. 13, the first assist control circuit 72 includes a multiplier 89 on a calculation path between the control circuit 87 and the adder 86. The multiplier 89 multiplies the compensation amount $I_9*$ calculated by the control circuit 87 by the gain G. If the yaw rate YR is abnormal, the gain G is set to zero, and the final compensation amount $I_9*$ is therefore zero. Accordingly, the compensation amount $I_9*$ based on the abnormal yaw rate YR is not used for calculation of the first assist controlled variable $I_{as1}*$.

The first assist control circuit 72 may not have a grip loss determination function depending on the product specifications etc. In this case, the grip loss determination circuit 88 shown in FIG. 13 is omitted in the first assist control circuit 72. The grip loss determination flag $F_{gld}$ is therefore not generated. In this case, the normal yaw rate determination circuit 132 may determine whether the yaw rate YR is normal or not based only on the determination condition (D) described above. If the determination condition (D) is satisfied, the normal yaw rate determination circuit 132 determines that the yaw rate YR is normal. If the determination condition (D) is not satisfied, the normal yaw rate determination circuit 132 determines that the yaw rate YR is abnormal.

A fifth embodiment of the steering control device will be described. The fifth embodiment is different from the fourth embodiment in the method for setting the gain G by the normal yaw rate determination circuit 132.

The normal yaw rate determination circuit 132 calculates the gain G by using a gain map $M_G$, instead of switching the gain G between zero and one according to the determination result of whether the yaw rate YR is correct or not.

Figure 16:
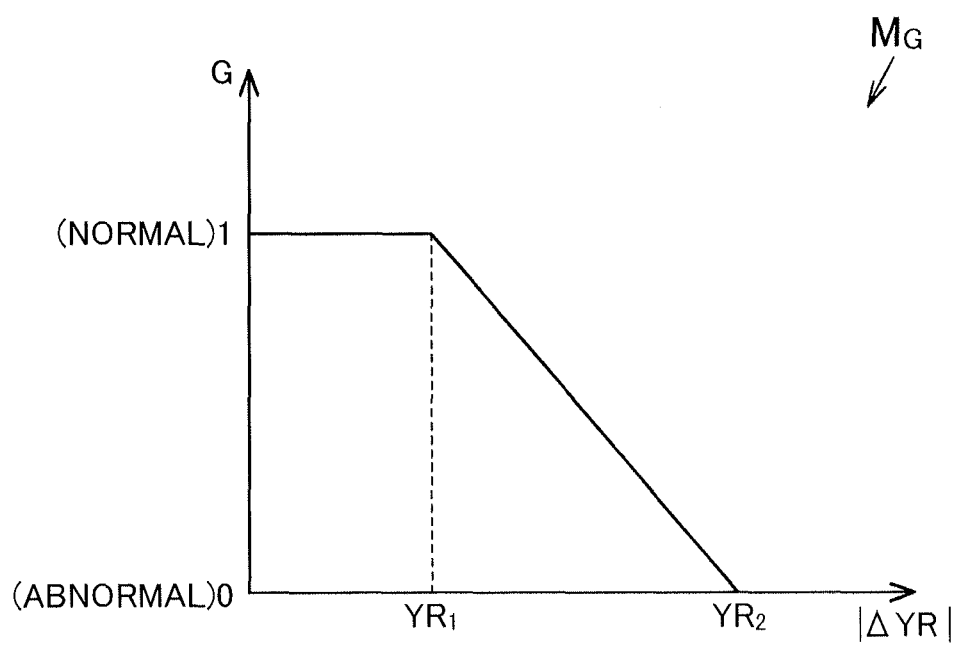
FIG. 16 is a map showing the relationship between the deviation between an actual yaw rate and an estimated yaw rate and gain in a fifth embodiment of the electronic control unit.

As shown in the graph of FIG. 16, the gain map $M_G$ is a map with the difference value between the actual yaw rate YR and the estimated yaw rate YR*, |ΔYR (=YR*−YR)|, on the abscissa and the gain G for the limiting values ($I_{UL4}$*, $I_{LL4}$*) based on the yaw rate YR on the ordinate. The gain map $M_G$ defines the relationship between the difference value |ΔYR| and the gain G. The gain map $M_G$ has the following characteristics. The gain G is maintained at one until the difference value 'ΔYR' increases from zero to a first set value $YR_1$. Once the difference value |ΔYR| becomes larger than the first set value $YR_1$, the gain G gradually decreases with an increase in difference value |ΔYR| until the difference value |ΔYR| reaches the second set value $VR_2$. Once the difference value |ΔYR| becomes larger than the second set value $YR_2$, the gain G is maintained at zero. The first set value $YR_1$ is set by experiments etc. based on the value at which there is a high probability that the yaw rate YR is normal. The second set value $YR_2$ is set by experiments etc. based on the value at which there is a high probability that the yaw rate YR is abnormal.

The fifth embodiment has the following functions and effects.

(9) The normal yaw rate determination circuit 132 can calculate the gain G according to the difference value |ΔYR| by using the gain map $M_G$. The normal yaw rate determination circuit 132 can determine that the yaw rate YR is abnormal, if the difference value |ΔYR| is larger than the second set value $YR_2$. When the difference value |ΔYR| is larger than the first set value $YR_1$ and equal to or smaller than the second set value $YR_2$, the gain G having a smaller value is calculated as the difference value |ΔYR| increases. That is, the higher the probability that the yaw rate YR is abnormal is, the smaller the limiting values ($I_{UL4}$*, $I_{LL4}$*) based on the yaw rate YR are. This restrains a sudden change in limiting values ($I_{UL4}$*, $I_{LL4}$*) based on the yaw rate YR and thus a sudden change in final limiting values ($I_{UL}$*, $I_{LL}$*) calculated by the upper and lower limit calculation circuit 73.

In the case where the configuration in which the first assist control circuit 72 includes the multiplier 89 as shown by the long dashed double-short dashed line in FIG. 13 is used as the configuration that stops compensation control based on the yaw rate YR when the yaw rate YR is abnormal, the multiplier 89 may multiply the compensation amount $I_9$* calculated by the control circuit 87 by the gain G calculated by using the gain map $M_G$. In this case, the gain G decreases as the probability that the yaw rate YR is abnormal increases. Accordingly, the compensation amount $I_9$* based on the yaw rate YR decreases with a decrease in gain G. When the difference value |ΔYR| is larger than the second set value $YR_2$, the gain G is zero and the compensation amount $I_9$* based on the yaw rate YR is also zero.

With the above configuration, the compensation amount $I_9$* can be gradually reduced to zero according to the abnormal level of the yaw rate YR. The above configuration can also restrain a sudden change in compensation amount $I_9$* based on the yaw rate YR and thus a sudden change in first assist controlled variable $I_{as1}$*. Contribution of the compensation amount $I_9$* to the first assist controlled variable $I_{as1}$* decreases as the abnormal level of the yaw rate YR increases. This can restrain the influence of the compensation amount $I_9$* based on the abnormal yaw rate YR on the first assist controlled variable $I_{as1}$*.

A sixth embodiment of the steering control device will be described. The sixth embodiment is different from the fourth embodiment in the process that is performed by the current command value calculation circuit 61 when the yaw rate YR detected by the yaw rate sensor 55 is abnormal.

Figure 17:
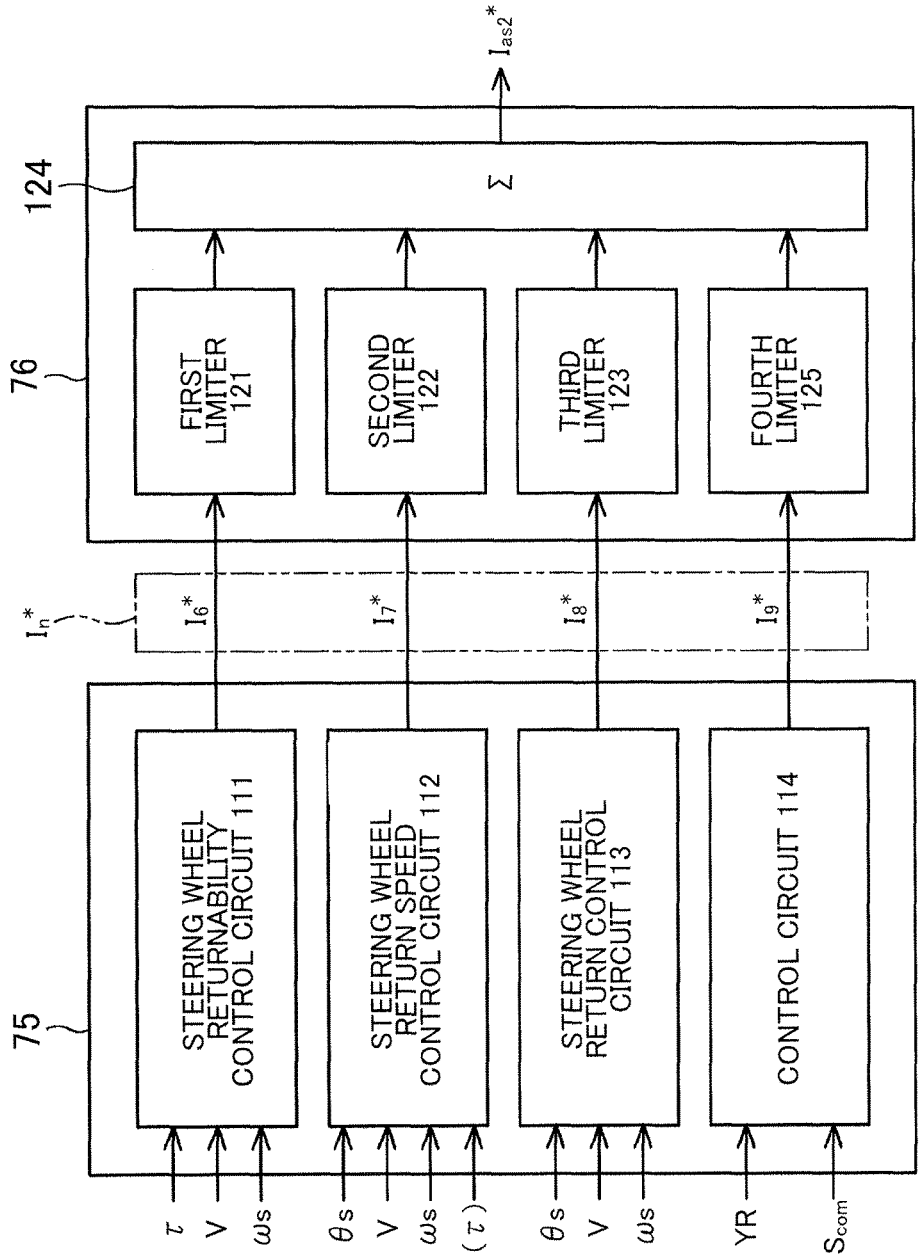
FIG. 17 is a control block diagram showing an example of a second assist control circuit and a second guard process circuit according to a sixth embodiment.

As shown in FIG. 17, the second assist control circuit 75 includes a control circuit 114 in addition to the steering wheel returnability control circuit 111, the steering wheel return speed control circuit 112, and the steering wheel return control circuit 113. The control circuit 114 has a calculation function similar to that of the control circuit 87 in the first assist control circuit 72. The control circuit 114 generates the compensation amount $I_9$* for the basic assist controlled variable $I_1$* based on the yaw rate YR detected by the yaw rate sensor 55. The control circuit 114 receives the notification signal $S_{com}$ generated by the normal yaw rate determination circuit 132 and recognizes whether the yaw rate YR is normal or abnormal based on the received notification signal $S_{com}$. If the control circuit 114 recognizes that the yaw rate YR is normal, it stops calculation of the compensation amount $I_9$* for the basic assist controlled variable $I_1$*. If the control circuit 114 recognizes that the yaw rate YR is abnormal, it performs calculation of the compensation amount $I_9$* for the basic assist controlled variable $I_1$*.

The second guard process circuit 76 includes, in addition to the first to third limiters 121 to 123, a fourth limiter 125 that independently limits the compensation amount $I_9$* having an abnormal value. The fourth limiter 125 has a function similar to that of the first to third limiters 121 to 123. If the compensation amount $I_9$* calculated by the control circuit 114 exceeds the upper limit $I_{th}$ in the positive direction, the fourth limiter 125 limits the compensation amount $I_9$* to the upper limit $I_{th}$. If the compensation amount $I_9$* exceeds the lower limit $-I_{th}$ in the negative direction, the fourth limiter 125 limits the compensation amount $I_9$* to the lower limit $-I_{th}$. The upper and lower limits $I_{th}$, $-I_{th}$ are set based on the maximum value (absolute value) of the compensation amount $I_9$* permitted in terms of ensuring the level of reliability required for the ECU 40 of the electric power steering system 10.

The control circuit 87 in the first assist control circuit 72 performs calculation of the compensation amount $I_9$* for the basic assist controlled variable $I_1$* if the notification signal $S_{com}$ generated by the normal yaw rate determination circuit 132 indicates that the yaw rate YR is normal. The first assist controlled variable $I_{as1}$* is calculated by taking the compensation amount $I_9$* based on this normal yaw rate YR into consideration. If the normal yaw rate determination circuit 132 determines that the yaw rate YR is normal, it sets the gain G to one. Accordingly, if the calculated first assist controlled variable $I_{as1}$* has an abnormal value for any reason, this first assist controlled variable $I_{as1}$* is appropriately limited to the final limiting values ($I_{UL}$*, $I_{LL}$*) reflecting the limiting values ($I_{UL4}$*, $I_{LL4}$*) calculated based on the normal yaw rate YR by using the fourth limit map M4.

If the notification signal $S_{com}$ generated by the normal yaw rate determination circuit 132 indicates that the yaw rate YR is abnormal, the control circuit 87 stops calculation of the compensation amount $I_9$* based on the yaw rate YR. The first assist controlled variable $I_{as1}$* is thus calculated without taking the compensation amount $I_9$* based on the abnormal yaw rate YR into consideration. If the normal yaw rate determination circuit 132 determines that the yaw rate YR is abnormal, it sets the gain G to zero. Since the upper and lower limits $I_{UL4}{}^*$, $I_{LL4}{}^*$ calculated by the yaw rate-sensitive limiters 95, 105 are multiplied by this gain G, the final upper and lower limits $I_{UL4}{}^*$, $I_{LL4}{}^*$ are zero. The upper and lower limits $I_{UL4}{}^*$, $I_{LL4}{}^*$ based on the abnormal yaw rate YR therefore do not affect the final upper and lower limits $I_{UL}{}^*$, $I_{LL}{}^*$ that are calculated by the upper and lower limit calculation circuit 73.

If the notification signal $S_{com}$ indicates that the yaw rate YR is abnormal, the control circuit 114 in the second assist control circuit 75 performs calculation of the compensation amount $I_9{}^*$ based on the yaw rate YR. Since the yaw rate YR is abnormal, the compensation amount $I_9{}^*$ that is calculated based on the yaw rate YR may also have an abnormal value. However, such an abnormal compensation amount $I_9{}^*$ is appropriately limited by the fourth limiter 125. The upper and lower limits $I_{th}$, $-I_{th}$ for the abnormal compensation amount $I_9{}^*$ are set based on the maximum value (absolute value) of the compensation amount $I_9{}^*$ permitted in terms of ensuring the level of reliability required for the ECU 40 of the electric power steering system 10. The level of reliability of the process of limiting the compensation amount $I_9{}^*$ by the fourth limiter 125 is therefore affected by the level of reliability (e.g., ASIL-QM) of the yaw rate YR. Accordingly, the second assist controlled variable $I_{as2}{}^*$ that is calculated by taking the compensation amount $I_9{}^*$ into consideration meets the required level of reliability. The final assist controlled variable $I_{as}{}^*$ that is obtained by adding the first assist controlled variable $I_{as1}{}^*$ and the second assist controlled variable $I_{as2}{}^*$ together also meets the required level of reliability.

The sixth embodiment has the following effects.

(10) Reliability of the final assist controlled variable $I_{as}{}^*$ can be ensured even if the first assist control circuit 72 includes the control circuit 87 that calculates the compensation amount $I_9{}^*$ based on the yaw rate YR for which safety (ASIL-A to ASIL-D) is not ensured.

(11) If the yaw rate YR is abnormal, the compensation amount $I_9{}^*$ calculated by the control circuit 114 of the second assist control circuit 75 is used instead of the compensation amount $I_9{}^*$ calculated by the control circuit 87 of the first assist control circuit 72. This compensation amount $I_9{}^*$ is appropriately limited by the fourth limiter 125. Regardless of whether the yaw rate YR is normal or abnormal, the final assist controlled variable $I_{as}{}^*$ is calculated by taking the compensation amount $I_9{}^*$ based on the yaw rate YR into consideration, whereby an excellent steering feel is maintained.

Compensation control based on the steering angle θs can be handled similarly to the compensation control based on the yaw rate YR of the present embodiment. That is, the steering wheel returnability control circuit 111, the steering wheel return speed control circuit 112, and the steering wheel return control circuit 113 are also provided in the first assist control circuit 72. A sensitive limiter that calculates the upper and lower limits for the first assist controlled variable $I_{as1}{}^*$ according to the steering angle θs is provided in the upper and lower limit calculation circuit 73. The second assist control circuit 75 has the configuration as shown in FIG. 17. A normal determination circuit (configuration corresponding to the normal yaw rate determination circuit 132) that determines whether the steering angle θs is normal or not is provided in the current command value calculation circuit 61. As in the present embodiment, the compensation amounts to be used are switched between the compensation amounts ($I_6{}^*$ to $I_8{}^*$) that are calculated by the control circuits (111 to 113) of the first assist control circuit 72 and the compensation amounts ($I_6{}^*$ to $I_8{}^*$) that are calculated by the control circuits (111 to 113) of the second assist control circuit 75, based on whether the steering angle θs is normal or abnormal.

Of the state quantities that can be used to calculate the assist controlled variable $I_{as}{}^*$, the state quantities that do not meet the required level of reliability include, e.g., lateral acceleration in addition to the steering angle θs and the yaw rate YR. The lateral acceleration refers to the acceleration that is applied in the direction (lateral direction) perpendicular to the traveling direction (longitudinal direction) when the vehicle turns. For example, the lateral acceleration is detected by an acceleration sensor that is mounted on the vehicle. Compensation control based on the lateral acceleration can also be handled similarly to the compensation control based on the yaw rate YR of the present embodiment. In this case, a control circuit that calculates the compensation amount based on the lateral acceleration is provided in each of the first assist control circuit 72 and the second assist control circuit 75. A normal determination circuit (configuration corresponding to the normal yaw rate determination circuit 132) that determines whether the lateral acceleration is normal or not is provided in the current command value calculation circuit 61. As in the present embodiment, the compensation amounts to be used are switched between the compensation amounts that are calculated by the control circuits of the first assist control circuit 72 and the compensation amounts that are calculated by the control circuits of the second assist control circuit 75, based on whether the lateral acceleration is normal or abnormal.

Each of the above embodiments may be modified as follows. The kind of compensation control that is performed in the first assist control circuit 72 and the second assist control circuit 75 and the signals that are used in the first assist control circuit 72 and the second assist control circuit 75 are changed as appropriate according to the specifications of the vehicle or the electric power steering system 10, etc. In the first to third embodiments, even in this case, the first assist control circuit 72 performs the limiting process using the limit map on the signal that meets the required level of reliability. The second assist control circuit 75 performs the limiting process using the upper and lower limits ($I_{th}$, $-I_{th}$) and the variation limiting process using the variation limiting value (δI) on the signal that does not meet the required level of reliability. The function to perform the variation limiting process may be omitted.

The steering wheel return speed control circuit 112 of the second assist control circuit 75 may be omitted, and the second assist control circuit 75 may be formed by only the steering wheel returnability control circuit 111 and the steering wheel return control circuit 113. The steering wheel returnability control circuit 111 of the second assist control circuit 75 may be omitted, and the second assist control circuit 75 may be formed by only the steering wheel return speed control circuit 112 and the steering wheel return control circuit 113. The second assist control circuit 75 may have only at least one of the steering wheel return speed control circuit 112 and the steering wheel return control circuit 113. Other compensation control circuit may be included in addition to the steering wheel returnability control circuit 111, the steering wheel return speed control circuit 112, and the steering wheel return control circuit 113. If the steering angle θs is not used for calculation of the assist controlled variable $I_{as}{}^*$ according to the product specifications etc. in the sixth embodiment, the parts having a function to calculate the compensation amount based on the steering angle θs, namely the steering wheel returnability control circuit 111, the steering wheel return speed control circuit 112, and the steering wheel return control circuit 113, may be omitted.

The control circuit that calculates the compensation amount whose contribution (influence) to the final assist controlled variable $I_{as}^*$ is smaller than the other controlled variables or compensation amounts may be provided in either the first assist control circuit 72 or the second assist control circuit 75. For example, the torque differential control circuit 84, which is a component of the first assist control circuit 72 in the first to fifth embodiments, may be provided as a component of the second assist control circuit 75. In this case, a limiter that limits the range of variation in compensation amount $I_4^*$ calculated by the torque differential control circuit 84 by using the upper and lower limits $I_{th}$, $-I_{th}$ is separately provided in the second guard process circuit 76. The compensation amount $I_4^*$ that is calculated by the torque differential control circuit 84 contributes to the overall final assist controlled variable $I_{as}^*$ only to a small extent. The level of reliability is therefore not affected regardless of whether the torque differential control circuit 84 is provided in the first assist control circuit 72 or the second assist control circuit 75.

The first to fourth limit maps M1 to M4 of the embodiments may be what is called vehicle speed-sensitive maps. That is, in the first to fourth limit maps M1 to M4, the limiting values (upper limits $I_{UL1}^*$ to $I_{UL4}^*$ and lower limits $I_{LL1}^*$ to $I_{LL4}^*$) for the first assist controlled variable $I_{as1}^*$ according to the state quantity ($\tau$, $d\tau$, $\omega s$, YR) are specified according to the vehicle speed V.

There are various types of electric power steering systems. The ECU 40 may be applied to such an electric power steering system that applies motor power to the rack shaft 23.

The ECU 40 is preferably used to control actuators that steer steered wheels not only in the electric power steering system 10 but also in a steer-by-wire system or an automatic steering system.

What is claimed is:

1. A steering control device for use with a power source to be applied to a steering mechanism of a vehicle, the steering control device comprising:
    a command value calculation circuit that calculates a command value for the power source that generates power to be applied to the steering mechanism, based on a first controlled variable and a second controlled variable which are calculated based on a plurality of types of state quantities indicating a steering state of a steering mechanism, the command value calculation circuit including:
        a first control circuit calculating the first controlled variable based on a first state quantity that meets a required level of reliability out of the plurality of types of state quantities, the required level of reliability being set based on standards defined by vehicle manufacturers including Automotive Safety Integrity Level (ASIL) A, B, C or D,
        a first processing circuit performing a first limiting process of setting, for each first state quantity, a first limiting value that limits a range of variation in the first controlled variable according to the first state quantity, and limiting the range of variation in the first controlled variable based on the first limiting value,
        a second control circuit calculating a basic component of the second controlled variable based on a second state quantity that does not meet the required level of reliability out of the plurality of types of state quantities, and
        a second processing circuit performing a second limiting process of limiting a range of variation in the basic component based on a predetermined second limiting value, and calculating the second controlled variable based on the basic component subjected to the second limiting process.

2. The steering control device according to claim 1, wherein,
    the command value calculation circuit includes
        a third control circuit that calculates a backup controlled variable to be used as a basis for calculation of the command value in case of an abnormal condition in which the first controlled variable is limited,
        a calculating unit that adds the first controlled variable and the second controlled variable together to generate a final controlled variable to be used as a basis for calculation of the command value in a normal condition in which the first controlled variable is not limited, and
        a switch circuit that switches the controlled variable to be used as the basis for calculation of the command value from the final controlled variable to the backup controlled variable in case of the abnormal condition.

3. The steering control device according to claim 1, wherein,
    the command value calculation circuit includes
        a third control circuit that calculates a backup controlled variable to be used as a basis for calculation of the command value in case of an abnormal condition in which the first controlled variable is limited,
        a switch circuit that switches the controlled variable to be used for calculation of the command value from the first controlled variable to the backup controlled variable in case of the abnormal condition, and
        a calculating unit that adds the second controlled variable to the first controlled variable received from the switch circuit or the backup controlled variable to generate a final controlled variable to be used as a basis for calculation of the command value.

4. The steering control device according to claim 1, wherein,
    the second control circuit calculates a plurality of types of the basic components based on the second state quantity, and
    the second processing circuit individually limits ranges of change in the plurality of types of the basic components by using the second limiting value in the second limiting process, and adds the basic components subjected to the second limiting process together to generate the second controlled variable.

5. The steering control device according to claim 1, wherein,
    the second limiting value includes an upper limit for the basic component of the second controlled variable, a lower limit for the basic component of the second controlled variable, and a variation limiting value that limits a variation in the basic component of the second controlled variable per unit time.

6. The steering control device according to claim 1, wherein,
the second state quantity includes a plurality of types of state quantities,
the first control circuit calculates the first controlled variable by taking into consideration the second state quantity different from the one that is used in the second control circuit out of the plurality of types of state quantities,
the first processing circuit sets a limiting value that limits the range of variation in the first controlled variable according to the second state quantity different from the one that is used in the second control circuit, and performs the first limiting process by taking the limiting value into consideration,
the command value calculation circuit includes a normal determination circuit that determines whether the second state quantity different from the one that is used in the second control circuit is normal or not, and
if the normal determination circuit determines that the second state quantity different from the one that is used in the second control circuit is not normal, the first control circuit calculates the first controlled variable without taking into consideration the second state quantity different from the one that is used in the second control circuit, and the first processing circuit performs the first limiting process without taking into consideration the limiting value that is set according to the second state quantity different from the one that is used in the second control circuit.

7. The steering control device according to claim 6, wherein,
the second state quantity that is used in the first control circuit includes a yaw rate,
the command value calculation circuit includes an estimated yaw rate calculation circuit that calculates an estimated yaw rate based on a vehicle speed detected by a vehicle speed sensor mounted on the vehicle and a steering angle detected by a steering sensor mounted on the vehicle, and
the normal determination circuit calculates a difference value between an actual yaw rate detected by a yaw rate sensor mounted on the vehicle and the estimated yaw rate calculated by the estimated yaw rate calculation circuit, and determines that the actual yaw rate is normal if the calculated difference value is smaller than a yaw rate determination threshold.

8. The steering control device according to claim 7, wherein,
the first control circuit includes a grip loss determination circuit that determines whether grip loss, which is a state where a tire has no grip on a road surface, has occurred or not based on the actual yaw rate, and
the normal determination circuit determines that the actual yaw rate is normal if the difference value between the actual yaw rate and the estimated yaw rate is smaller than the yaw rate determination threshold and if the grip loss determination circuit determines that the grip loss has not occurred.

9. The steering control device according to claim 1, wherein,
the first control circuit calculates the first controlled variable by taking the second state quantity into consideration,
the first processing circuit sets a limiting value that limits the range of variation in the first controlled variable according to the second state quantity and performs the first limiting process by taking the limiting value into consideration,
the command value calculation circuit includes a normal determination circuit that determines whether the second state quantity is normal or not,
if the normal determination circuit determines that the second state quantity is normal, the first control circuit calculates the first controlled variable by taking the second state quantity into consideration, the first processing circuit performs the first limiting process by taking the limiting value according to the second state quantity into consideration, and the second control circuit stops calculation of the basic component of the second controlled variable based on the second state quantity, and
if the normal determination circuit determines that the second state quantity is not normal, the first control circuit calculates the first controlled variable without taking the second state quantity into consideration, the first processing circuit performs the first limiting process without taking the limiting value according to the second state quantity into consideration, and the second control circuit performs calculation of the basic component of the second controlled variable based on the second state quantity.

10. The steering control device according to claim 1, wherein,
the power source is a motor that generates an assist force serving as the power that is applied to the steering mechanism.

* * * * *